United States Patent
Yamaguchi

(10) Patent No.: US 10,054,448 B2
(45) Date of Patent: Aug. 21, 2018

(54) GUIDING METHOD AND GUIDING SYSTEM

(71) Applicant: Panasonic Intellectual Property Corporation of America, Torrance, CA (US)

(72) Inventor: Takahiro Yamaguchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 5 days.

(21) Appl. No.: 14/416,900

(22) PCT Filed: May 30, 2014

(86) PCT No.: PCT/JP2014/002892
§ 371 (c)(1),
(2) Date: Jan. 23, 2015

(87) PCT Pub. No.: WO2014/196178
PCT Pub. Date: Dec. 11, 2014

(65) Prior Publication Data
US 2015/0204677 A1    Jul. 23, 2015

Related U.S. Application Data

(60) Provisional application No. 61/830,730, filed on Jun. 4, 2013.

(51) Int. Cl.
*G01C 21/20* (2006.01)
*G06Q 30/06* (2012.01)
(Continued)

(52) U.S. Cl.
CPC ........... *G01C 21/206* (2013.01); *G06Q 30/06* (2013.01); *H04W 4/04* (2013.01); *H04W 64/00* (2013.01)

(58) Field of Classification Search
CPC ...... G01C 21/206; H04W 4/04; H04W 64/00; G06Q 30/06
See application file for complete search history.

(56) References Cited

U.S. PATENT DOCUMENTS 8,624,725 B1 *  1/2014  MacGregor ........... H04W 4/026
                                                340/539.13
2003/0204453 A1  10/2003  Kawamata
(Continued)

FOREIGN PATENT DOCUMENTS

CN    102376052    3/2012
JP    2002-175465   6/2002
(Continued)

OTHER PUBLICATIONS

International Search Report dated Jun. 24, 2014 in International (PCT) Application No. PCT/JP2014/002892.
(Continued)

*Primary Examiner* — Khoi H Tran
*Assistant Examiner* — Kelly D Williams
(74) *Attorney, Agent, or Firm* — Wenderoth, Lind & Ponack, L.L.P.

(57) ABSTRACT

A commodity layout database (101) retains commodity arrangement information in which a plurality of kinds of commodity identification information for identifying a plurality of commodities arranged indoors and indoor arrangement positions of the plurality of commodities are associated with each other. A photographing unit (201) photographs the periphery of an indoor. A commodity specifying unit (103) analyzes a photographed image and specifies commodity identification information included in the photographed image. A guidance information creating unit (104) specifies an indoor arrangement position of a registered commodity registered in advance by the user on the basis of the specified commodity identification information, the commodity (Continued)

arrangement information, and registered commodity identification information for identifying the registered commodity, and creates guidance information for guiding the user to the specified arrangement position of the registered commodity. A display unit (203) presents the created guidance information.

7 Claims, 20 Drawing Sheets

(51) Int. Cl.
*H04W 64/00* (2009.01)
*H04W 4/04* (2009.01)

(56) References Cited

U.S. PATENT DOCUMENTS

| | | | |
|---|---|---|---|
| 2010/0070365 A1* | 3/2010 | Siotia | G01C 21/20 705/14.49 |
| 2012/0047038 A1 | 2/2012 | Sano et al. | |
| 2012/0047040 A1 | 2/2012 | Ueda et al. | |
| 2013/0010103 A1 | 1/2013 | Ihara et al. | |
| 2013/0138534 A1 | 5/2013 | Herwig | |
| 2013/0325321 A1* | 12/2013 | Pylappan | G01C 21/20 701/420 |
| 2014/0279294 A1* | 9/2014 | Field-Darragh | G06Q 10/087 705/28 |

FOREIGN PATENT DOCUMENTS

| | | |
|---|---|---|
| JP | 2003-323539 | 11/2003 |
| JP | 2011-227875 | 11/2011 |
| JP | 2011-253324 | 12/2011 |
| JP | 2012-185576 | 9/2012 |
| JP | 2013-156934 | 8/2013 |

OTHER PUBLICATIONS

"Where is the guacamole? Don't worry, Philips' supermarket lighting will tell you!", Feb. 17, 2014, http://www.philips.com/a/about/news/archive/standard/news/press/2014/20140217-Intelligent-in-store-LED-lighting-communicates-with-your-smartphone.html.

* cited by examiner

GUIDING METHOD AND GUIDING SYSTEM

TECHNICAL FIELD

The present invention relates to a guiding method and a guising system for guiding a user to the position of a commodity in which the user is interested.

BACKGROUND ART

A GPS (Global Positioning System) is a system for specifying a position on the Earth. The GPS is effective when the position of an outdoor mobile body is specified in the order of several meters, for example, when a user drives an automobile on a road. A car navigation system specifies the present position of the user (the automobile) using the GPS and guides the user to a destination.

For example, Patent Literature 1 discloses a shopping guidance information providing apparatus that searches for a store present within a fixed distance from a terminal position and selling a registered purchase planned commodity and, when the store selling the purchase planned commodity is found near a user, informs, for guidance, a mobile terminal held by the user of information concerning the store.

However, in an indoor environment such as the inside of a building, in some case, a GPS signal is blocked by a roof or a wall and cannot be received. In some case, the GPS signal cannot be directly received behind a building and the GPS signal arriving bypassing the building is received to specify the present position. In this case, detection accuracy of the present position is sometimes deteriorated by the influence of the GPS signal arriving bypassing the building. In the conventional GPS, the present position cannot be specified in the order of 10 centimeters to 1 meter. Therefore, there is a problem in that it is difficult to specify the present position of a user in an indoor environment such as the inside of a store and guide the user to the position of a predetermined commodity.

CITATION LIST

Patent Literature

Patent Literature 1: Japanese Unexamined Patent Publication No. 2002-175465

SUMMARY OF INVENTION

The present invention has been devised to solve the problem and it is an object of the present invention to provide a guiding method and a guiding system that can guide a user to an indoor position of a commodity in which the user is interested.

A guiding method according to an aspect of the present invention includes: a commodity arrangement information retaining step of retaining, in a commodity arrangement information retaining unit, commodity arrangement information in which a plurality of kinds of commodity identification information for identifying a plurality of commodities arranged indoors and indoor arrangement positions of the plurality of commodities are associated with each other; a photographing step of photographing the periphery of an indoor user; a specifying step of analyzing a photographed image photographed in the photographing step and specifying commodity identification information included in the photographed image; and a guiding step of specifying an indoor arrangement position of a registered commodity registered in advance by the user on the basis of the commodity identification information specified in the specifying step, the commodity arrangement information retained in the commodity arrangement information retaining unit, and registered commodity identification information for identifying the registered commodity, and presenting guidance information for guiding the user to the specified arrangement position of the registered commodity.

According to the present invention, it is possible to guide the user to an indoor position of a commodity in which the user is interested using arrangement positions of commodities included in a photographed image and an indoor arrangement position of a registered commodity registered in advance by a user.

DESCRIPTION OF EMBODIMENTS

Figure 1:
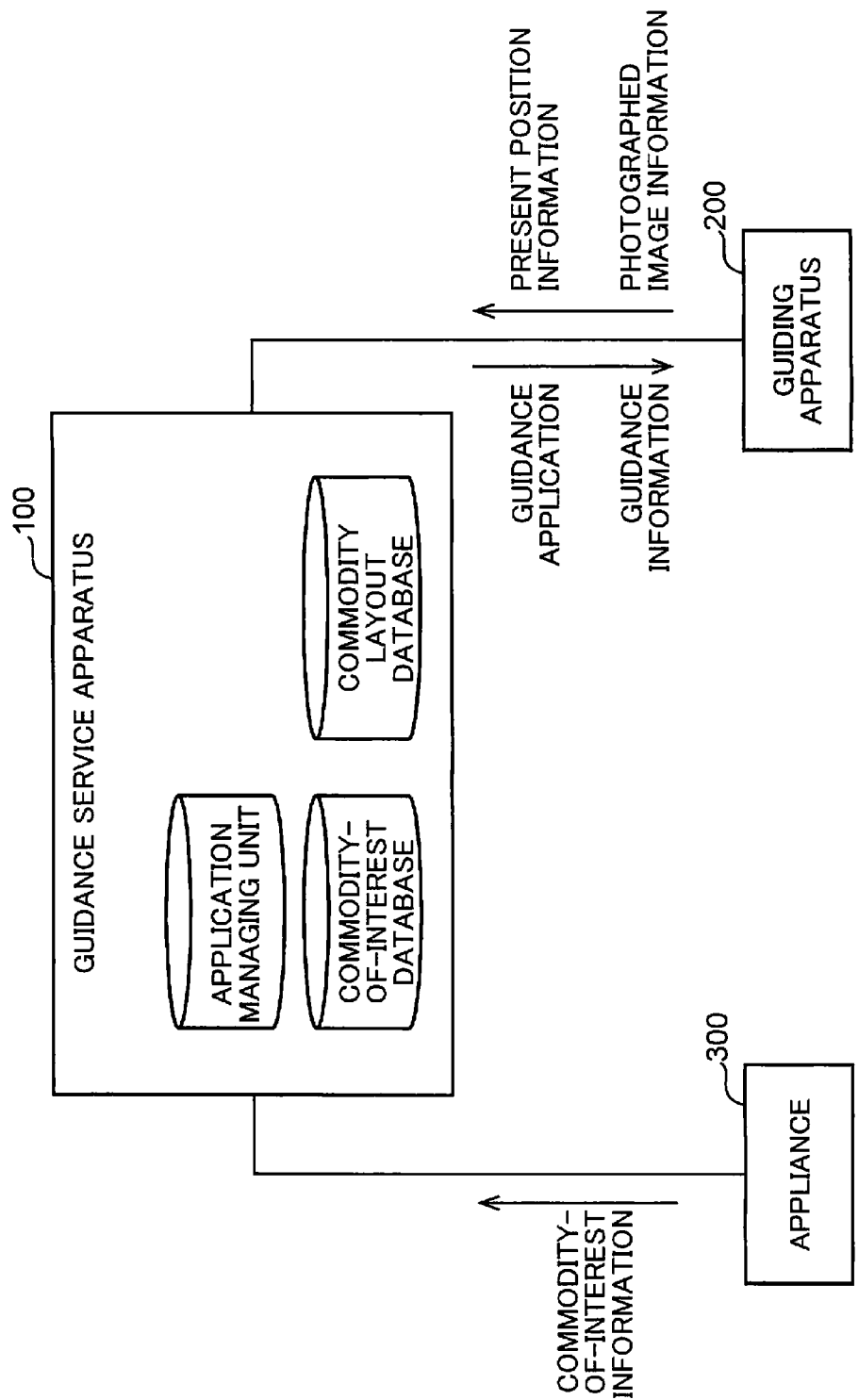
FIG. 1 is a diagram showing the overall configuration of a guiding system in an embodiment of the present invention.

An embodiment of the present invention is explained below with reference to the drawings. Note that the embodiment explained below is an embodied example of the present invention and does not limit the technical scope of the present invention.

A guiding system in this embodiment is a system that guides a user to the position of a commodity in which the user is interested (a target commodity that the user desires to purchase) in a store in which a large number of commodities are arranged on display shelves. The user holds a portable terminal (a smart phone) having a camera function. The guiding system guides the user to a target position using an image photographed by the user using a camera.

In this embodiment, the following five examples are explained.

(1) In-Store Search 1

First, an application photographs the inside of a store using the camera mounted on the smart phone. Subsequently, the application or a server performs, through image recognition, matching of a commodity list showing a commodity in which the user is interested and a photographed image. Subsequently, the application indicates on a screen of the smart phone that the commodity in which the user is interested is present in the vicinity.

(2) In-Store Search 2

First, the application photographs the inside of the store using the camera mounted on the smart phone. Subsequently, the application or the server performs, through image recognition, matching of a commodity list showing a commodity in which the user is interested and a photographed image. Subsequently, the application superimposes and presents, on a photographed image displayed on the screen of the smart phone, a mark indicating the position of the commodity in which the user is interested.

(3) In-Store Guidance 1

First, the application photographs the inside of the store using the camera mounted on the smart phone. Subsequently, the application or the server specifies displayed commodities through image recognition and estimates a position of the smart phone (the user) from commodity layout information in which the commodities and positions where the commodities are arranged are associated with each other. Subsequently, the application presents, from the estimated position of the smart phone and the position of the commodity in which the user is interested, a relative position of the commodity in which the user is interested on the screen of the smart phone as a text or the like or notifies the relative position by sound.

(4) In-Store Guidance 2

First, the application photographs the inside of the store using the camera mounted on the smart phone. Subsequently, the application or the server specifies displayed commodities through image recognition and estimates a position of the smart phone (the user) from commodity layout information in which the commodities and positions where the commodities are arranged are associated with each other. Subsequently, the application presents, from the estimated position of the smart phone and the position of the commodity in which the user is interested, a relative direction to the commodity in which the user is interested on the screen of the smart phone.

(5) In-Store Guidance 3

First, the application photographs the inside of the store using the camera mounted on the smart phone. Subsequently, the application or the server specifies displayed commodities through image recognition and estimates a position of the smart phone (the user) from commodity layout information in which the commodities and positions where the commodities are arranged are associated with each other. Subsequently, the application superimposes and presents, on a photographed image displayed on the screen of the smart phone, a mark indicating the position of the commodity in which the user is interested present on the rear side of a shelf.

<Overall Configuration>

FIG. 1 is a diagram showing the overall configuration of the guiding system in the embodiment of the present invention. The guiding system includes a guidance service apparatus 100, a guiding apparatus 200, and an appliance 300.

The appliance 300 is a home electric appliance such as a refrigerator, a washing machine, or a microwave oven.

The appliance 300 is used when a user registers a commodity in which the user is interested, in the guidance service apparatus 100. For example, a user interface of the appliance 300 displays a commodity list and receives selection of a commodity from the commodity list by the user. When the commodity is selected, the appliance 300 notifies the guidance service apparatus 100 of the selected commodity.

The guidance service apparatus 100 is, for example, a server apparatus. The guidance service apparatus 100 stores the notified commodity in a commodity-of-interest list as a commodity in which the user is interested (hereinafter referred to as commodity of interest). The commodity in which the user is interested is, for example, a commodity that the user explicitly designates and desires to purchase (a shopping note). The commodity in which the user is interested is a commodity automatically selected by an appliance in a home such as a refrigerator or a microwave oven as a commodity needed to be purchased soon by automatically managing and grasping a use state or a storage state of purchased commodities in the refrigerator.

The guiding apparatus 200 is, for example, a smart phone that executes an application. The guiding apparatus 200 may be a portable tablet computer or a cellular phone or may be a terminal having a camera function. The guiding apparatus 200 downloads a guidance application from the guidance service apparatus 100. The guidance application is managed by an application managing unit included in the guidance service apparatus 100. The application managing unit transmits the guidance application according to a request from the guiding apparatus 200.

Note that the guiding apparatus 200 may download the guidance application from a server apparatus that is different from the guidance service apparatus 100 and manages the guidance application. Note that the guiding apparatus 200 and the appliance 300 may be the same apparatus.

The guiding apparatus 200 executes the downloaded guidance application. The guidance application (program)

executed on the guiding apparatus 200 controls a camera provided in the guiding apparatus 200 and photographs an image of the periphery of the user. The guiding apparatus 200 transmits the photographed image to the guidance service apparatus 100. The guidance service apparatus 100 analyzes the received image and specifies a photographed commodity. The guiding apparatus 200 may retain in advance analysis data used for an analysis of an image. In this case, the guidance application analyzes the photographed image and specifies the photographed commodity. When the guiding apparatus 200 specifies the commodity included in the photographed image, the guiding apparatus 200 notifies the guidance service apparatus 100 of the specified commodity.

As a method of specifying the commodity included in the photographed image, for example, there is a method of recording and managing, in a database, a package photograph of a commodity or a text described on a package of a commodity and performing matching of an image with the package photograph or the text. Matching of a text extracted from the photographed image and a text recorded in the database in advance may be performed to specify the commodity included in the photographed image. Note that the commodity included in the photographed image may be specified by other methods.

Subsequently, the respective configurations of the guidance service apparatus 100, the guiding apparatus 200, and the appliance 300 are explained.

Figure 2:
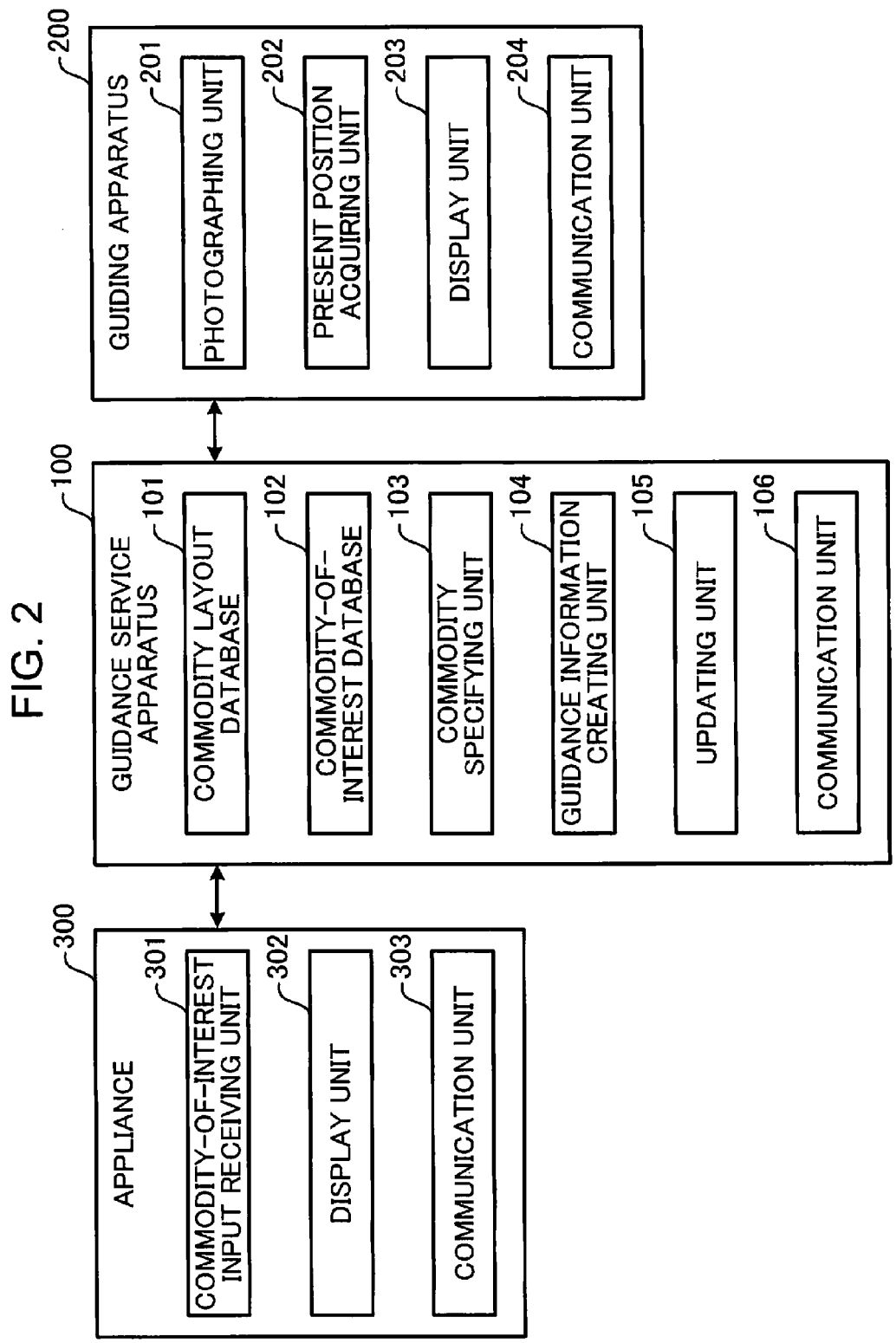
FIG. 2 is a diagram showing the configurations of a guidance service apparatus, a guiding apparatus, and an appliance in the embodiment of the present invention.

FIG. 2 is a diagram showing the configurations of the guidance service apparatus 100, the guiding apparatus 200, and the appliance 300 in the embodiment of the present invention. The guidance service apparatus 100 and the guiding apparatus 200 are communicably connected to each other via a network. The guidance service apparatus 100 and the appliance 300 are communicably connected to each other via the network. The network is, for example, the Internet.

The appliance 300 includes a commodity-of-interest input receiving unit 301, a display unit 302, and a communication unit 303.

The commodity-of-interest input receiving unit 301 receives an input of a commodity of interest by the user. The commodity-of-interest input receiving unit 301 receives the input of the commodity of interest by the user, for example, through a keyboard displayed on a screen of a touch panel. The commodity-of-interest input receiving unit 301 may receive the input of the commodity of interest by the user through sound recognition.

The display unit 302 displays various kinds of information. The display unit 302 displays selectable commodities. The display unit 302 displays commodities used in the appliance 300. For example, when the appliance 300 is a refrigerator, the display unit 302 displays foodstuffs such as frozen foods, vegetables, and fruits. The user selects a desired commodity of interest out of a commodity list displayed on the display unit 302.

The communication unit 303 receives various kinds of information from the guidance service apparatus 100 and transmits various kinds of information to the guidance service apparatus 100. The communication unit 303 receives a selectable commodity list from the guidance service apparatus 100. The communication unit 303 transmits commodity-of-interest information concerning the commodity of interest received by the commodity-of-interest input receiving unit 301 to the guidance service apparatus 100. Note that the commodity-of-interest information includes a user ID for identifying the user.

The guiding apparatus 200 includes a photographing unit 201, a present position acquiring unit 202, a display unit 203, and a communication unit 204.

The photographing unit 201 photographs the periphery of the user in a building and acquires a photographed image. Note that the photographed image may be a still image or may be a moving image.

The present position acquiring unit 202 is configured by, for example, a GPS and acquires the present position of the guiding apparatus 200.

The communication unit 204 receives various kinds of information from the guidance service apparatus 100 and transmits various kinds of information to the guidance service apparatus 100. The communication unit 204 transmits the photographed image photographed by the photographing unit to the guidance service apparatus 100. The communication unit 204 receives guidance information transmitted by the guidance service apparatus 100. The guidance information is information for guiding the user to the position of a commodity of interest.

The display unit 203 displays various kinds of information. The display unit 203 displays the guidance information received by the communication unit 204.

The guidance service apparatus 100 includes a commodity layout database 101, a commodity-of-interest database 102, a commodity specifying unit 103, a guidance information creating unit 104, an updating unit 105, and a communication unit 106.

The commodity layout database 101 retains commodity arrangement information in which a plurality of kinds of commodity identification information for identifying a plurality of commodities arranged in the building and arrangement positions in the building of the plurality of commodities are associated with each other. Note that the commodity arrangement information is present for each store. The commodity identification information includes, for example, commodity names or images of the commodities.

The commodity-of-interest database 102 retains commodity-of-interest identification information for identifying a commodity of interest registered in advance by the user. The commodity-of-interest database 102 retains a commodity-of-interest list for each user and, for example, retains the commodity-of-interest list in association with the user ID for identifying the user. The commodity-of-interest identification information includes, for example, a commodity name of the commodity of interest or an image of the commodity of interest.

The commodity specifying unit 103 analyzes the photographed image photographed by the photographing unit 201 of the guiding apparatus 200 and specifies commodity identification information included in the photographed image.

The guidance information creating unit 104 specifies an arrangement position in the building of the commodity of interest on the basis of the commodity identification information specified by the commodity specifying unit 103, the commodity arrangement information retained in the commodity layout database 101, and the commodity-of-interest identification information for identifying the commodity of interest registered in advance by the user and creates guidance information for guiding the user to the specified arrangement position of the commodity of interest. The guidance information creating unit 104 specifies, on the basis of present position information received from the guiding apparatus 200, a store where the user is currently present and reads out commodity arrangement information corresponding to the specified store from the commodity layout database 101.

When the commodity identification information specified by the commodity specifying unit 103 and the commodity-of-interest identification information retained in the commodity-of-interest database 102 coincide with each other, the guidance information creating unit 104 creates, as the guidance information, an image indicating a position in the photographed image of the commodity of interest. That is, when the commodity identification information specified by the commodity specifying unit 103 and the commodity-of-interest identification information retained in the commodity-of-interest database 102 coincide with each other, this means that the commodity of interest is present in the photographed image. The guidance information is information indicating where in the photographed image the commodity of interest is present.

When the commodity identification information specified by the commodity specifying unit 103 and the commodity-of-interest identification information retained in the commodity-of-interest database 102 do not coincide with each other, the guidance information creating unit 104 creates, as the guidance information, an image indicating the position of the commodity of interest. That is, when the commodity identification information specified by the commodity specifying unit 103 and the commodity-of-interest identification information retained in the commodity-of-interest database 102 do not coincide with each other, this means that the commodity of interest is absent in the photographed image. The guidance information is information indicating where on the outside of the photographed image the commodity of interest is present.

Note that, when the commodity identification information specified by the commodity specifying unit 103 and the commodity-of-interest identification information retained in the commodity-of-interest database 102 do not coincide with each other, the guidance information creating unit 104 may create, as the guidance information, an image indicating a direction in which the commodity of interest is present.

When the commodity identification information specified by the commodity specifying unit 103 and the commodity-of-interest identification information retained in the commodity-of-interest database 102 do not coincide with each other and the commodity of interest is present in a hidden position in the photographed image, the guidance information creating unit 104 creates, as the guidance information, an image indicating an imaginary position of the commodity of interest. For example, when the commodity of interest is not displayed on a shelf included in the photographed image and the commodity of interest is displayed on a shelf on the rear side of the shelf included in the photographed image, the guidance information creating unit 104 creates guidance information imaginarily indicating the position of the commodity of interest not seen from the present position of the user.

The updating unit 105 updates, on the basis of the photographed image photographed by the photographing unit 201 of the guiding apparatus 200, the commodity arrangement information retained in the commodity layout database 101. The updating unit 105 specifies an arrangement position in the building of the commodity identification information specified by the commodity specifying unit 103. When the specified arrangement position is different from an arrangement position of the commodity identification information included in the commodity arrangement information, the updating unit 105 updates the commodity arrangement information to change the arrangement position of the commodity identification information included in the commodity arrangement information to the specified arrangement position.

The communication unit 106 receives various kinds of information from the appliance 300 and transmits various kinds of information to the appliance 300. The communication unit 106 receives various kinds of information from the guiding apparatus 200 and transmits various kinds of information to the guiding apparatus 200. The communication unit 106 receives the present position information and the photographed image information transmitted by the guiding apparatus 200. The communication unit 106 receives the commodity-of-interest information transmitted by the appliance 300. The communication unit 106 transmits the guidance information created by the guidance information creating unit 104 to the guiding apparatus 200.

Subsequently, the operation of the guiding system in the embodiment of the present invention is explained.

Figure 3:
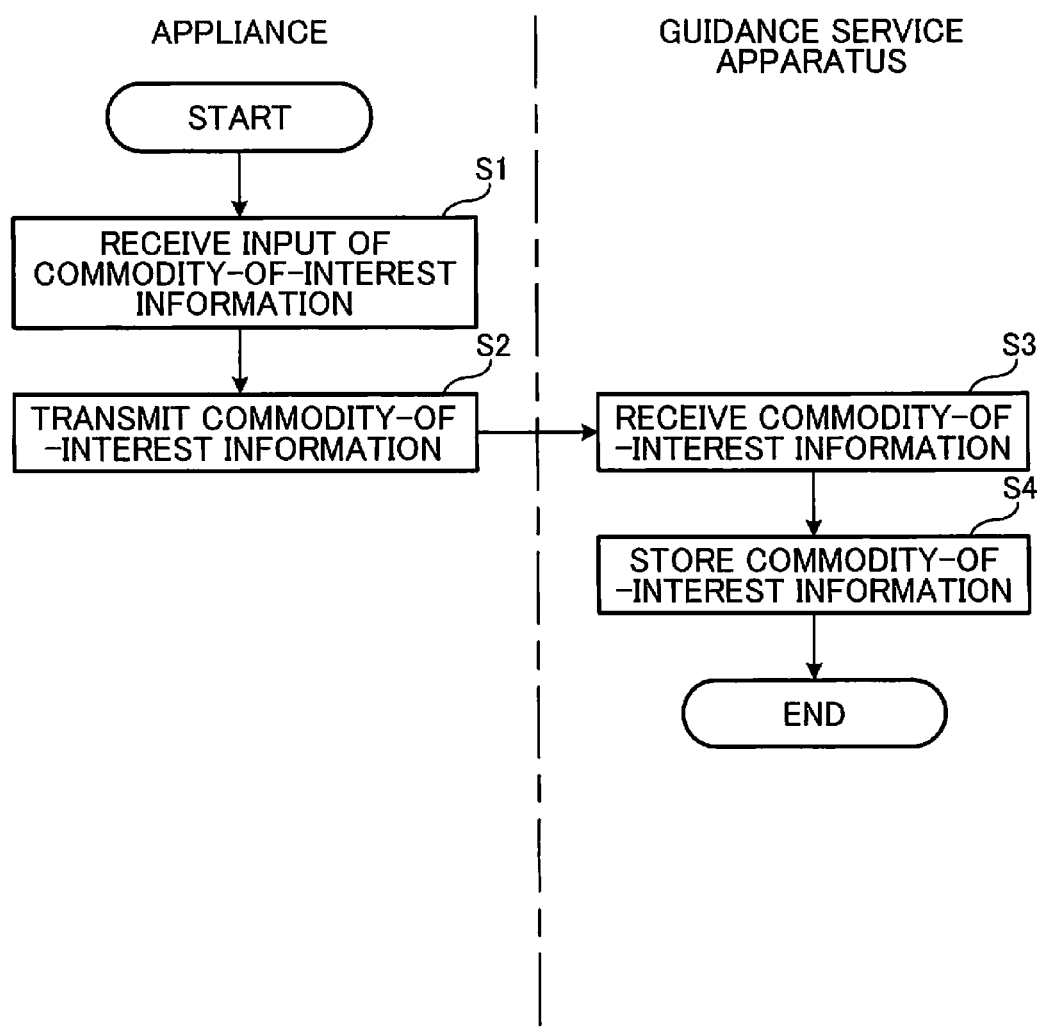
FIG. 3 is a flowchart for explaining the operations of the appliance and the guidance service apparatus in the embodiment of the present invention.

FIG. 3 is a flowchart for explaining the operations of the appliance and the guidance service apparatus in the embodiment of the present invention.

First, in step S1, the commodity-of-interest input receiving unit 301 of the appliance 300 receives an input of commodity-of-interest information by the user. The user inputs a commodity that the user is interested in (a commodity of interest). For example, the user inputs, as the commodity of interest, a commodity that the user plans to purchase. Note that the commodity-of-interest input receiving unit 301 may receive selection of a desired commodity out of a plurality of commodities displayed on the display unit 302. The commodity-of-interest input receiving unit 301 may receive an input of a commodity name of the commodity of interest or a serial number of the commodity of interest. Further, the commodity-of-interest input receiving unit 301 may receive a type of the commodity as the commodity-of-interest information. The type of the commodity is not information capable of uniquely identifying the commodity such as a specific commodity name but is information capable of specifying a rough type of the commodity such as confectionary, frozen food, meat, fish, or vegetable.

Subsequently, in step S2, the communication unit 303 transmits the commodity-of-interest information received by the commodity-of-interest input receiving unit 301 to the guidance service apparatus 100. In this case, the communication unit 303 adds the user ID for identifying the user to the commodity-of-interest information and transmits the user ID. The user ID may be input by the user or may be stored in the appliance 300 in advance.

Subsequently, in step S3, the communication unit 106 of the guidance service apparatus 100 receives the commodity-of-interest information transmitted by the appliance 300.

Subsequently, in step S4, the communication unit 106 stores the received commodity-of-interest information in the commodity-of-interest database 102. In this case, the communication unit 106 stores the commodity-of-interest information in association with the received user ID.

As explained above, the commodity of interest is registered in the guidance service apparatus 100 in advance.

Figure 4:
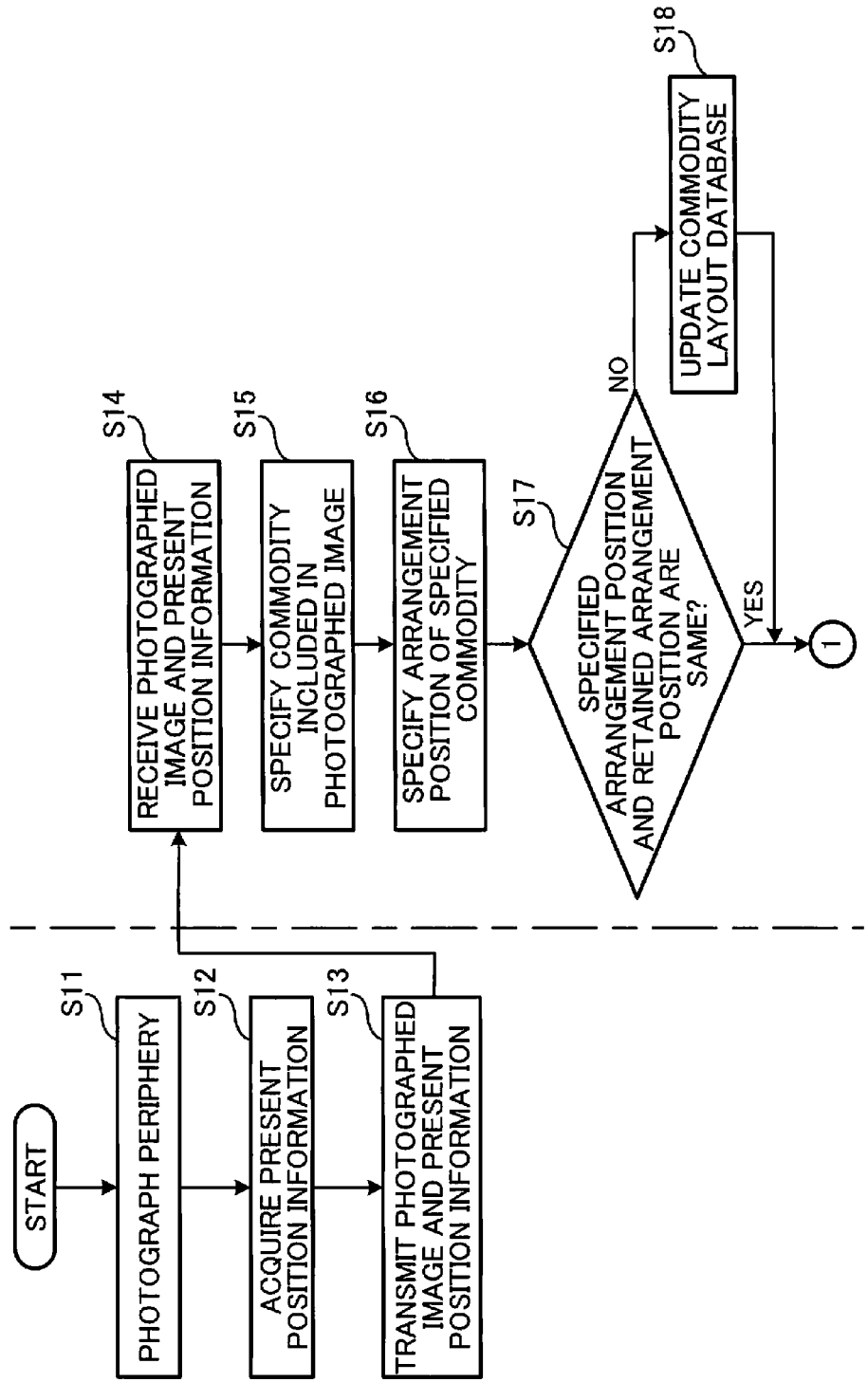
FIG. 4 is a first flowchart for explaining the operations of the guiding apparatus and the guidance service apparatus in the embodiment of the present invention.
Figure 5:
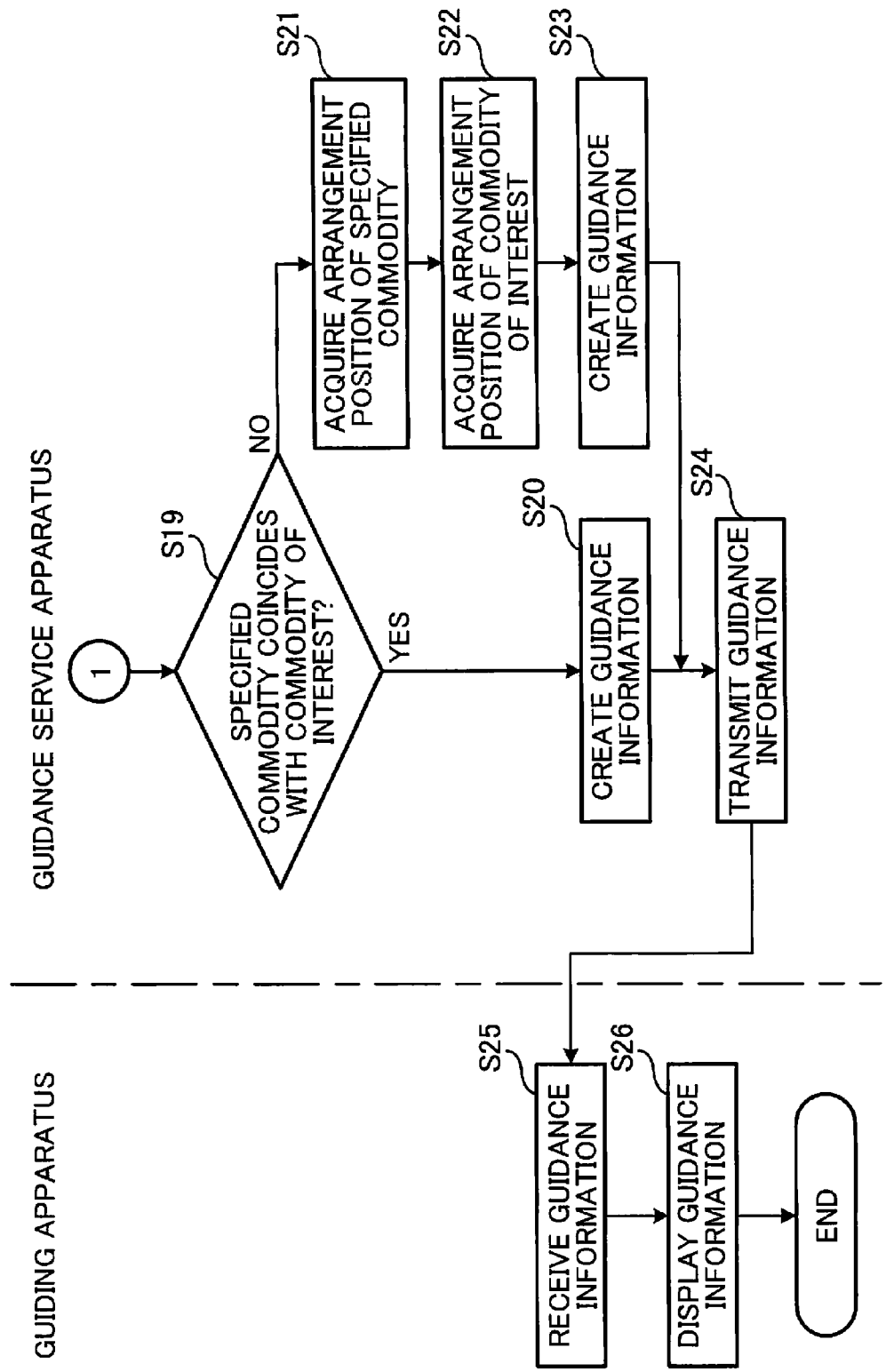
FIG. 5 is a second flowchart for explaining the operations of the guiding apparatus and the guidance service apparatus in the embodiment of the present invention.

FIG. 4 is a first flowchart for explaining the operations of the guiding apparatus and the guidance service apparatus in the embodiment of the present invention. FIG. 5 is a second flowchart for explaining the operations of the guiding apparatus and the guidance service apparatus in the embodiment of the present invention.

First, in step S11, the photographing unit 201 of the guiding apparatus 200 photographs the periphery of the user in a store. In this case, the photographing unit 201 photographs a shelf on which a plurality of commodities are displayed in the store.

Subsequently, in step S12, the present position acquiring unit 202 acquires present position information indicating the present position of the guiding apparatus 200. The present position information is represented by, for example, latitude and longitude.

Subsequently, in step S13, the communication unit 303 transmits a photographed image photographed by the photographing unit 201 and the present position information acquired by the present position acquiring unit 202 to the guidance service apparatus 100. In this case, the communication unit 303 adds the user ID for identifying the user to the photographed image and the present position information and transmits the user ID. The user ID may be input by the user or may be registered in the guiding apparatus 200 in advance.

Note that, in this embodiment, the guiding apparatus 200 acquires and transmits the present position information. However, the present invention is not particularly limited to this. The guiding apparatus 200 may receives an input of an address or a store name of the store and transmits the received address or store name of the store as the present position information.

Subsequently, in step S14, the communication unit 106 of the guidance service apparatus 100 receives the photographed image and the present position information transmitted by the guiding apparatus 200.

Subsequently, in step S15, the commodity specifying unit 103 analyzes the photographed image received by the communication unit 106 and specifies a commodity included in the photographed image.

Subsequently, in step S16, the updating unit 105 specifies an arrangement position of the commodity specified by the commodity specifying unit 103. In this case, the updating unit 105 analyzes the photographed image to thereby recognize a shelf on which the specified commodity is displayed, recognize on which plate of the shelf the specified commodity is arranged, and specify on which plate of which shelf in the store the specified commodity is arranged. Note that, in the shelf on which the commodity is displayed in the store, for example, a shelf name and plate numbers are posted. The shelf name and the plate numbers are identified by an image analysis.

Subsequently, in step S17, the updating unit 105 determines whether the specified arrangement position and an arrangement position corresponding to the commodity specified by the commodity specifying unit 103 acquired from the commodity arrangement information retained in the commodity layout database 101 are the same.

When it is determined that the specified arrangement position and the retained arrangement position are not the same (NO in step S17), in step S18, the updating unit 105 updates the commodity layout database 101. That is, the updating unit 105 updates the arrangement position corresponding to the commodity specified by the commodity specifying unit 103 retained in the commodity layout database 101 to the specified arrangement position.

Consequently, even if a new commodity is displayed or a commodity is transferred to another shelf, it is possible to always update the commodity arrangement information of the commodity layout database 101 to latest information. An administrator or the like does not need to update the commodity arrangement information of the commodity layout database 101. It is possible to automatically update the commodity arrangement information of the commodity layout database 101.

On the other hand, when it is determined that the specified arrangement position and the retained arrangement position are the same (YES in step S17), in step S19, the guidance information creating unit 104 determines whether the commodity specified by the commodity specifying unit 103 coincides with the commodity of interest retained in the commodity-of-interest database 102.

When it is determined that the specified commodity coincides with the commodity of interest (YES in step S19), in step S20, the guidance information creating unit 104 creates, as the guidance information, an image indicating a position in the photographed image of the commodity of interest.

On the other hand, when it is determined that the specified commodity does not coincide with the commodity of interest (NO in step S19), in step S21, the guidance information creating unit 104 acquires an arrangement position corresponding to the specified commodity from the commodity layout database 101.

Subsequently, in step S22, the guidance information creating unit 104 acquires an arrangement position corresponding to the commodity of interest from the commodity layout database 101.

Subsequently, in step S23, the guidance information creating unit 104 creates, as the guidance information, an image indicating the position of the commodity of interest.

Subsequently, in step S24, the communication unit 106 transmits the guidance information created by the guidance information creating unit 104 to the guiding apparatus 200.

Subsequently, in step S25, the communication unit 204 of the guiding apparatus 200 receives the guidance information transmitted by the guidance service apparatus 100.

Subsequently, in step S26, the display unit 302 displays the guidance information received by the communication unit 204.

Figure 6:
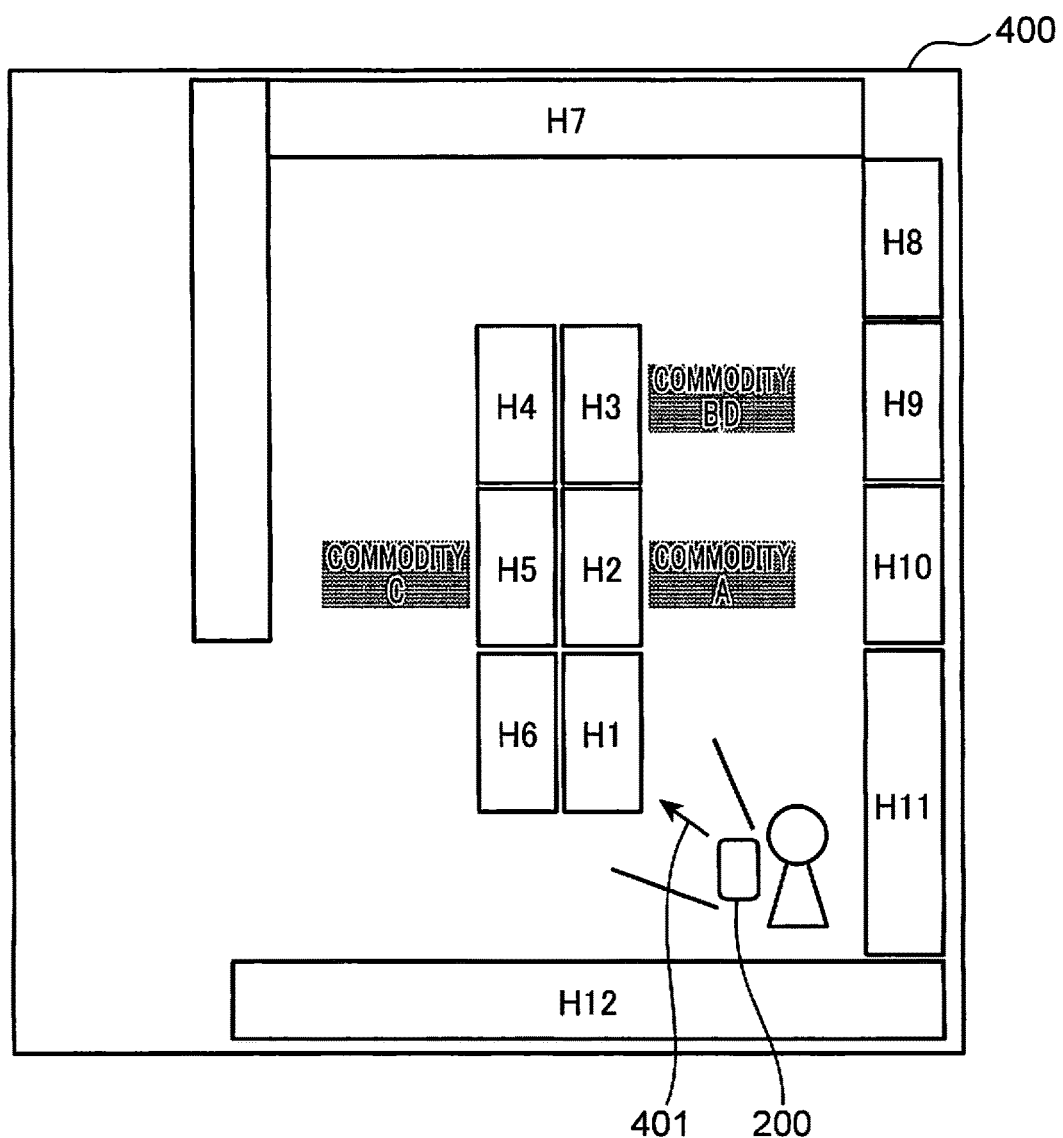
FIG. 6 is a diagram for explaining a photographing direction in which a user photographs the inside of a store using the guiding apparatus in the embodiment of the present invention.

Subsequently, a specific display example of the guidance information is explained. FIG. 6 is a diagram for explaining a photographing direction for photographing the inside of a store by the user using the guiding apparatus in the embodiment of the present invention.

As shown in FIG. 6, a plurality of shelves are arranged in a store 400. Shelf names (H1 to H12) are allocated to the respective plurality of shelves. The user performs photographing in a photographing direction 401 indicated by an arrow in FIG. 6 using the guiding apparatus 200. A commodity A is arranged on the shelf "H2", a commodity B and a commodity D are arranged on the shelf "H3", and a commodity C is arranged on the shelf "H5". The commodity A, the commodity B, the commodity C, and the commodity D are respectively commodities of interest.

Figure 7:
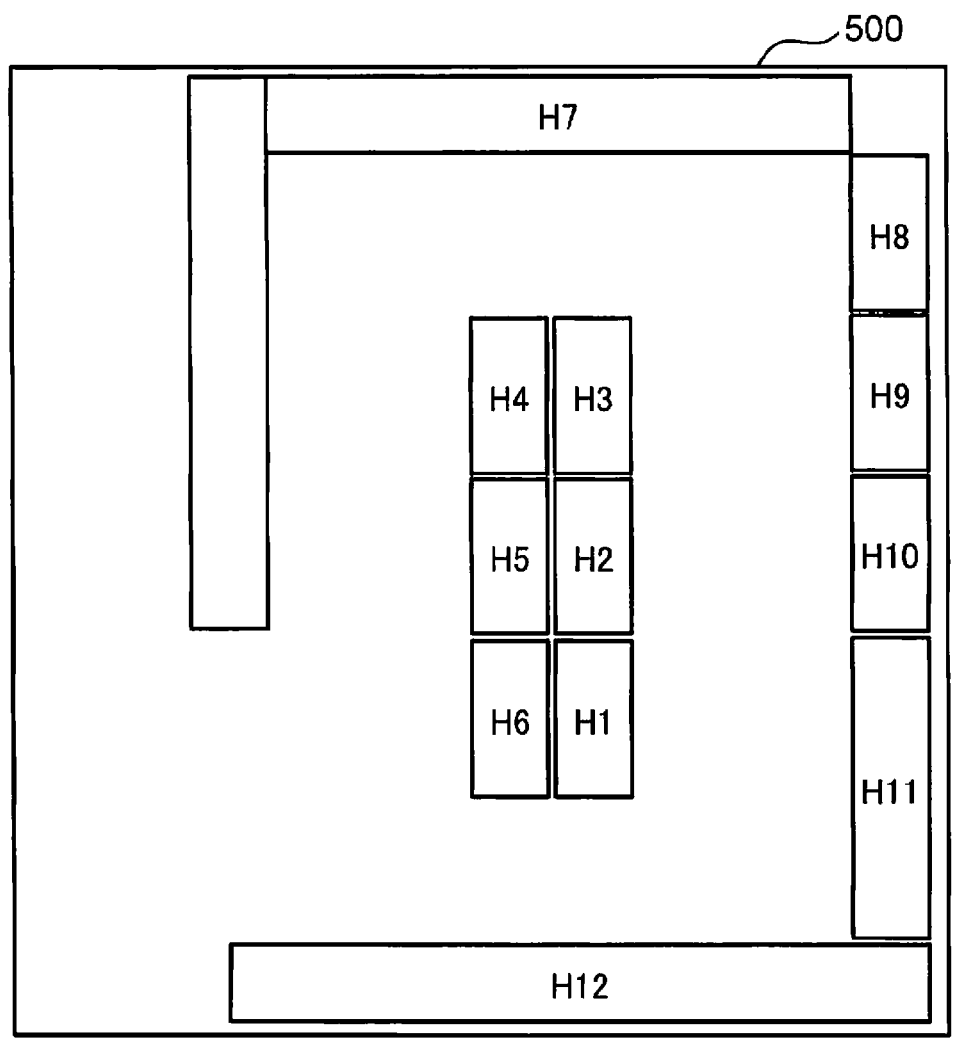
FIG. 7 is a diagram showing an example of an in-store layout diagram retained in a commodity layout database.
Figure 8:
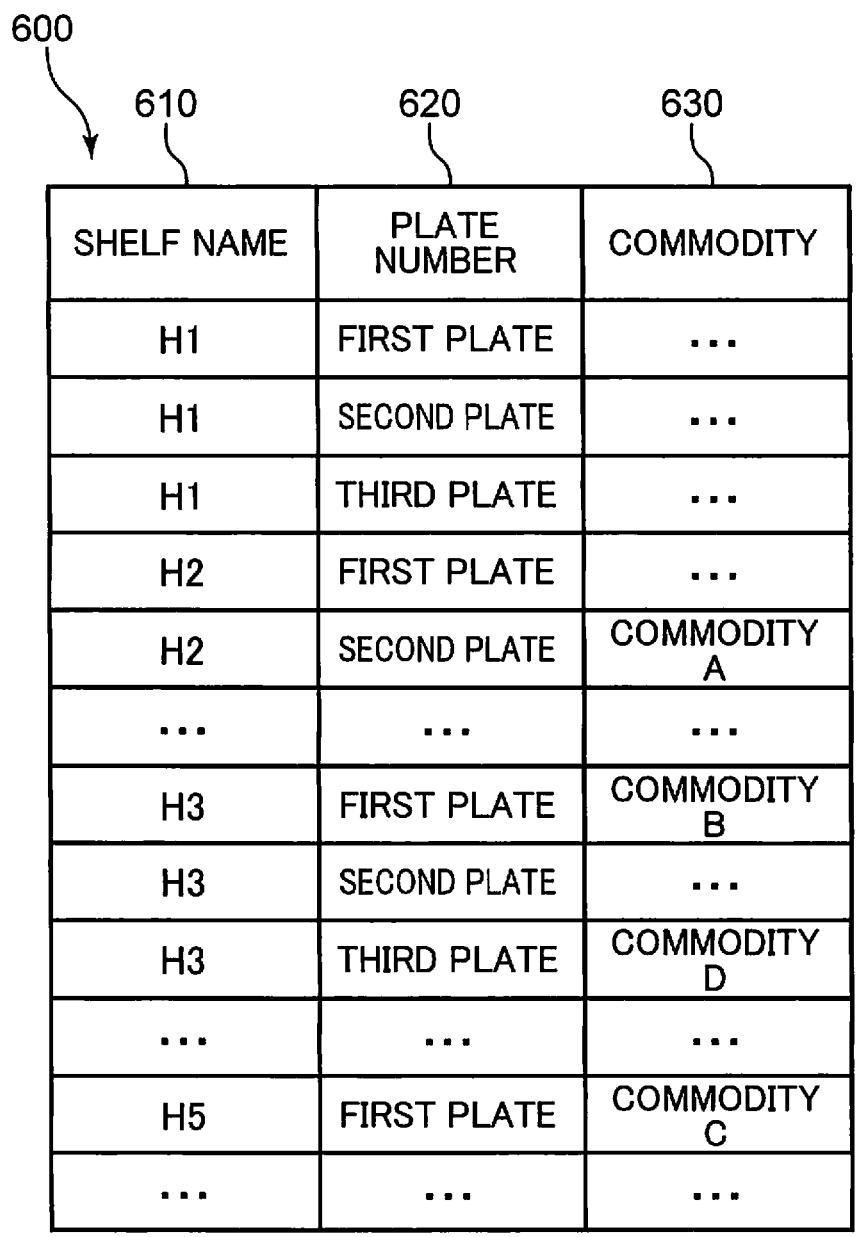
FIG. 8 is a diagram showing an example of commodity layout information retained in the commodity layout database.

FIG. 7 is a diagram showing an example of an in-store layout diagram retained in the commodity layout database. FIG. 8 is a diagram showing an example of commodity layout information retained in the commodity layout database.

A in-store layout diagram 500 shown in FIG. 7 is a plan view representing the arrangement of the shelves in the store. Note that the in-store layout diagram 500 is two-dimensionally represented but may be three-dimensionally represented. In commodity layout information 600 shown in FIG. 8, a shelf name 610, a plate number 620, and a commodity 630 are associated with one another. It is seen from the commodity layout information 600 that, for example, the commodity A is arranged on the second plate of the shelf name "H2", the commodity B is arranged on the first plate of the shelf name "H3", the commodity C is arranged on the first plate of the shelf name "H5", and the commodity D is arranged on the third plate of the shelf name "H3".

When the specified commodity coincides with the commodity of interest in the commodity-of-interest database 102 managed and stored by the guidance service apparatus 100, the guidance service apparatus 100 notifies the guiding apparatus 200 of guidance information indicating that the commodity of interest is included in a photographing range. The guiding apparatus 200 outputs guidance information indicating that the commodity of interest is included in the photographing range.

Figure 9:
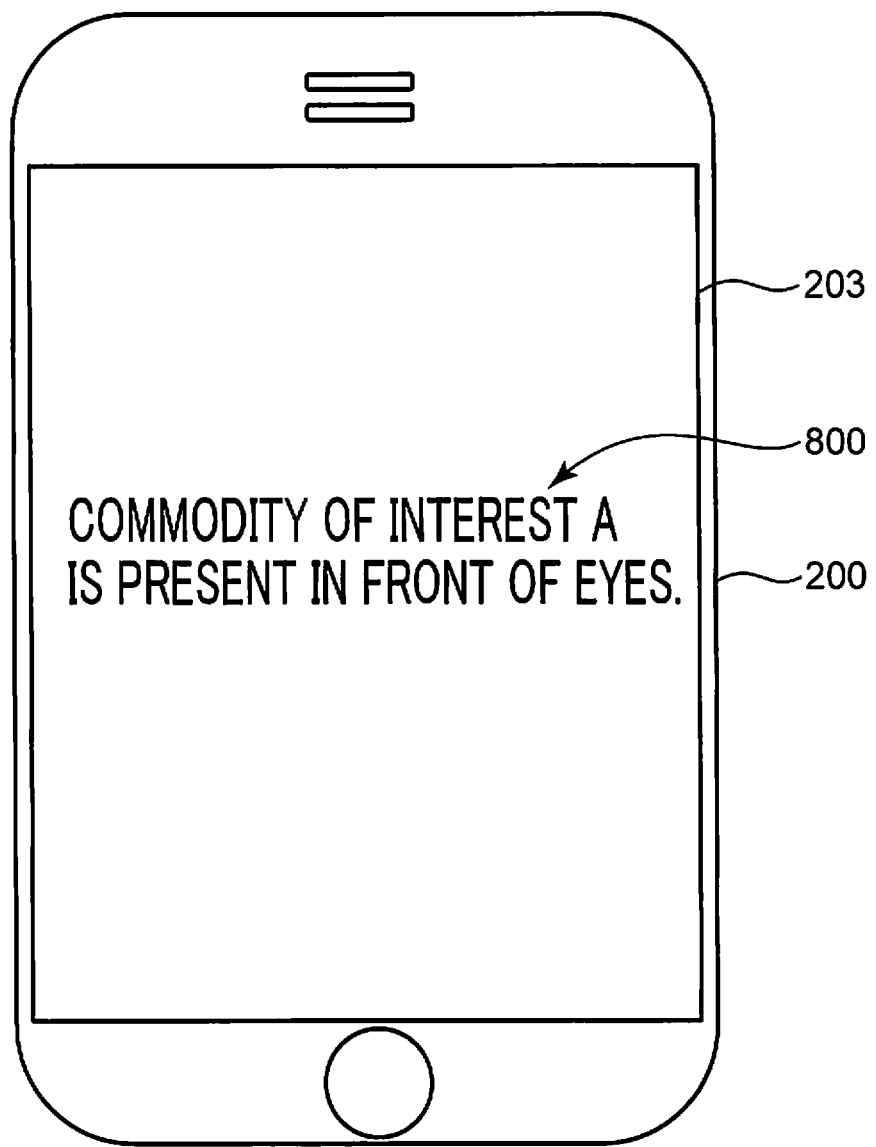
FIG. 9 is a diagram showing an example of guidance information displayed when a commodity of interest is present in a photographed image.

FIG. 9 is a diagram showing an example of guidance information displayed when the commodity of interest is present in the photographed image. When the commodity A is the commodity of interest and photographed from the position shown in FIG. 6, the commodity of interest is present in the photographed image. In this case, as shown in FIG. 9, the display unit 203 of the guiding apparatus 200 presents guidance information 800 indicating that the commodity of interest is present in front of the eyes. The guidance information 800 is represented in a text format.

Figure 10:
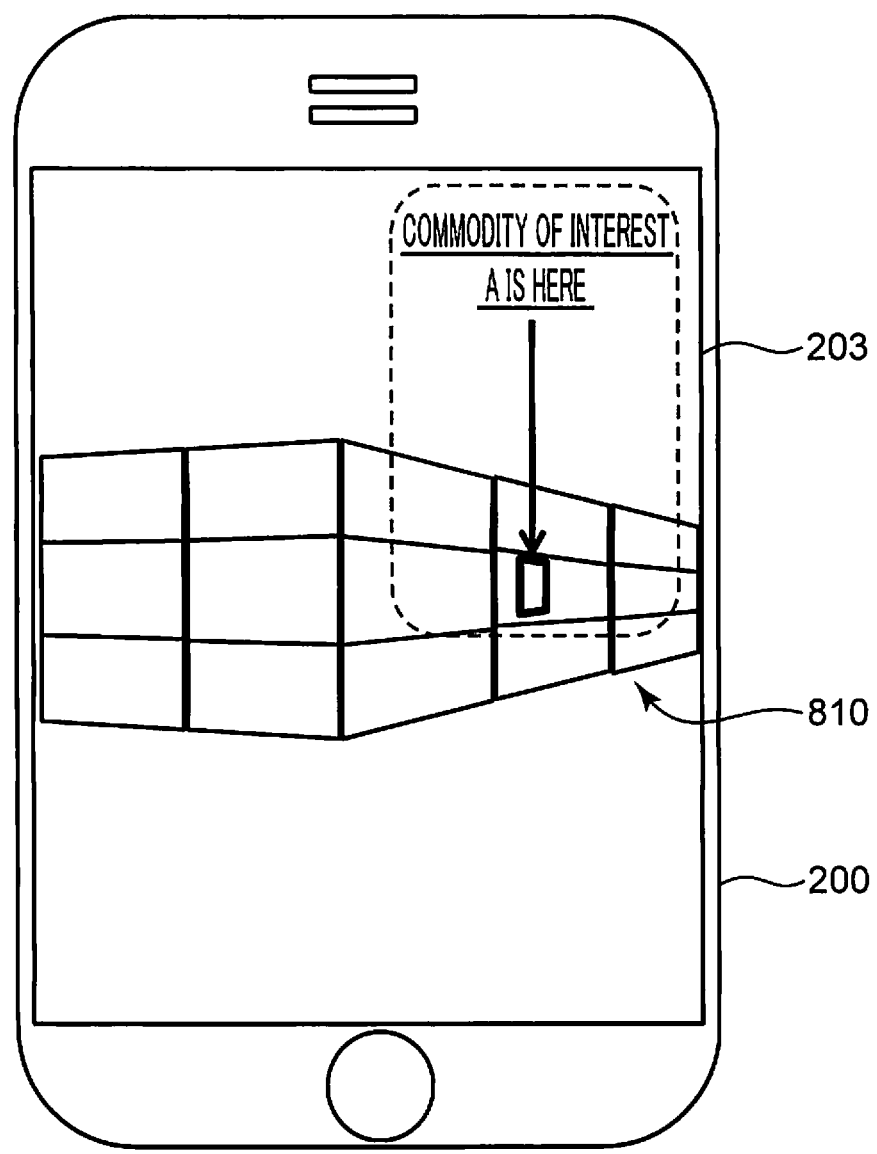
FIG. 10 is a diagram showing another example of the guidance information displayed when the commodity of interest is present in the photographed image.
Figure 11:
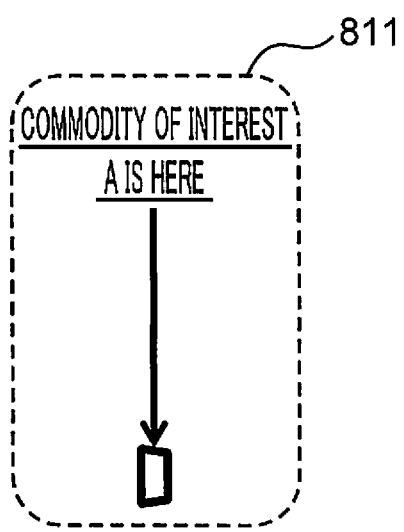
FIG. 11 is a diagram showing an example of a user interface component image used in creating the guidance information shown in FIG. 10.

FIG. 10 is a diagram showing another example of the guidance information displayed when the commodity of interest is present in the photographed image. FIG. 11 is a diagram showing an example of a user interface component image used when the guidance information shown in FIG. 10 is created.

The guidance information creating unit 104 creates guidance information 810 in which an user interface component image 811 indicating the position of the commodity of interest is superimposed on the photographed image. Note that the user interface component image 811 is stored in advance in a memory of the guidance service apparatus 100.

Note that, in this embodiment, the guidance information creating unit 104 creates the guidance information 810 in which the user interface component image 811 indicating the position of the commodity of interest is superimposed on the photographed image. However, the present invention is not particularly limited to this. The guidance information creating unit 104 may create, as the guidance information, only the user interface component image 811 indicating the position of the commodity of interest. In this case, the guiding apparatus 200 superimposes the guidance information (the user interface component image 811) received from the guidance service apparatus 100 on an image photographed by the photographing unit 201 on a real time basis and displays the guidance information. The guidance information is transmitted together with information for specifying a display position of the guidance information on a display screen of the display unit 203.

When the commodity of interest is absent among commodities specified from the image photographed by the guiding apparatus 200, the guidance service apparatus 100 creates, using the commodity layout database 101, guidance information for guiding the user to the commodity of interest.

Figure 12:
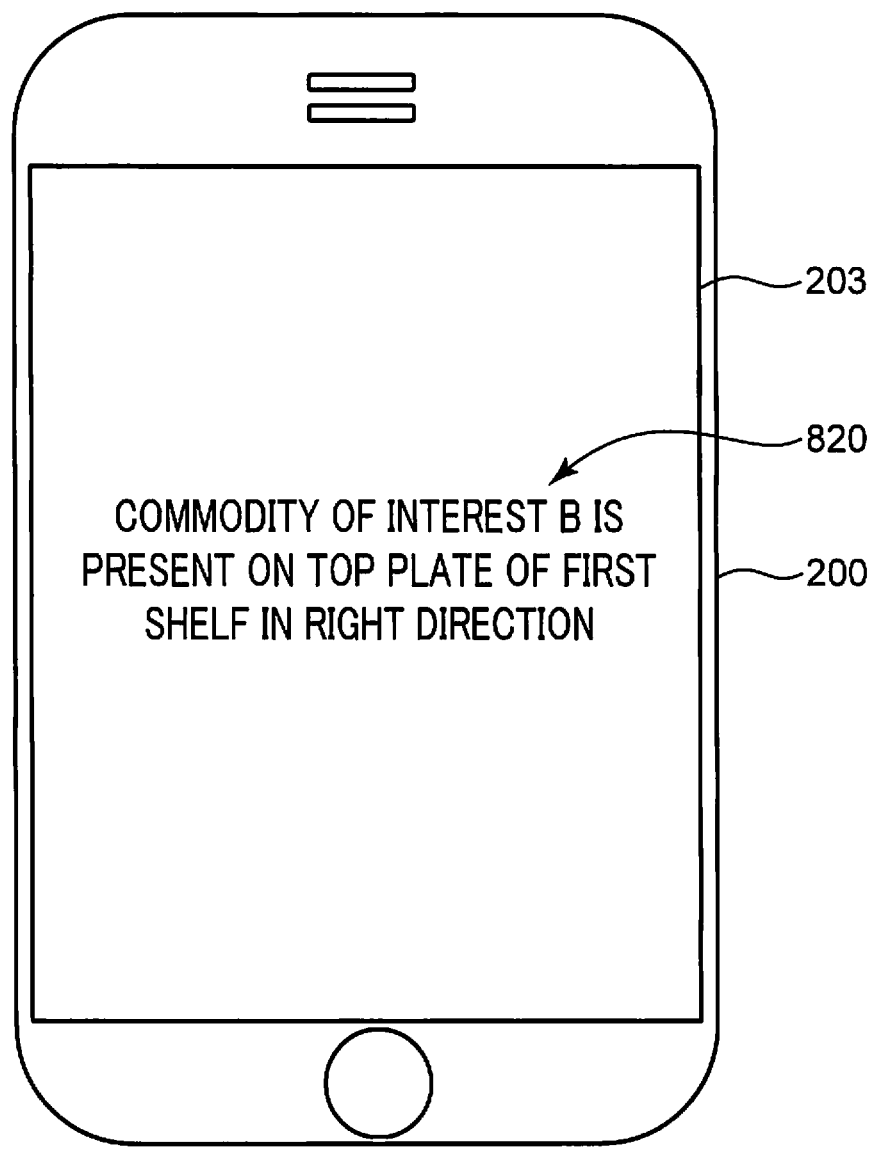
FIG. 12 is a diagram showing an example of guidance information displayed when the commodity of interest is absent in the photographed image.

FIG. 12 is a diagram showing an example of guidance information displayed when the commodity of interest is absent in the photographed image.

When the commodity of interest is absent among the commodities specified from the image photographed by the guiding apparatus 200, the guidance information creating unit 104 of the guidance service apparatus 100 accesses the commodity layout database 101 and acquires the position of a commodity specified from the photographed image in the store. For example, when the commodity A is the specified commodity, by referring to the commodity layout database 101, the guidance information creating unit 104 can specify that the commodity A is present on the second plate of the shelf H2.

Subsequently, the guidance information creating unit 104 accesses the commodity layout database 101 and acquires a position in the store of the commodity of interest. For example, when the commodity B is the commodity of interest, by referring to the commodity layout database 101, the guidance information creating unit 104 can specify that the commodity B is present on the first plate of the shelf H3.

Subsequently, the guidance information creating unit 104 creates guidance information for guiding the user from the position in the store of the commodity specified from the acquired photographed image to the position in the store of the acquired commodity of interest.

The guidance service apparatus 100 notifies the guiding apparatus 200 of the guidance information for guiding the user from the photographing position to the position of the commodity of interest. The guiding apparatus 200 outputs the guidance information for guiding the user from the photographing position to the position of the commodity of interest.

Note that the guidance service apparatus 100 may notify the guiding apparatus 200 of the position of the commodity of interest. The guiding apparatus 200 may create, on the basis of the position of the commodity of interest notified by the guidance service apparatus 100, the guidance information for guiding the user from the photographing position to the position of the commodity of interest.

When the commodity B is present in the commodity-of-interest list and the commodity A is the specified commodity, the guidance information creating unit 104 can specify that the commodity B is displayed on the first plate of the first shelf in the right direction from the commodity A.

In this case, as shown in FIG. 12, the display unit 203 of the guiding apparatus 200 presents guidance information 820 indicating in a text format that the commodity B is present on the top plate of the first shelf in the right direction.

Figure 13:
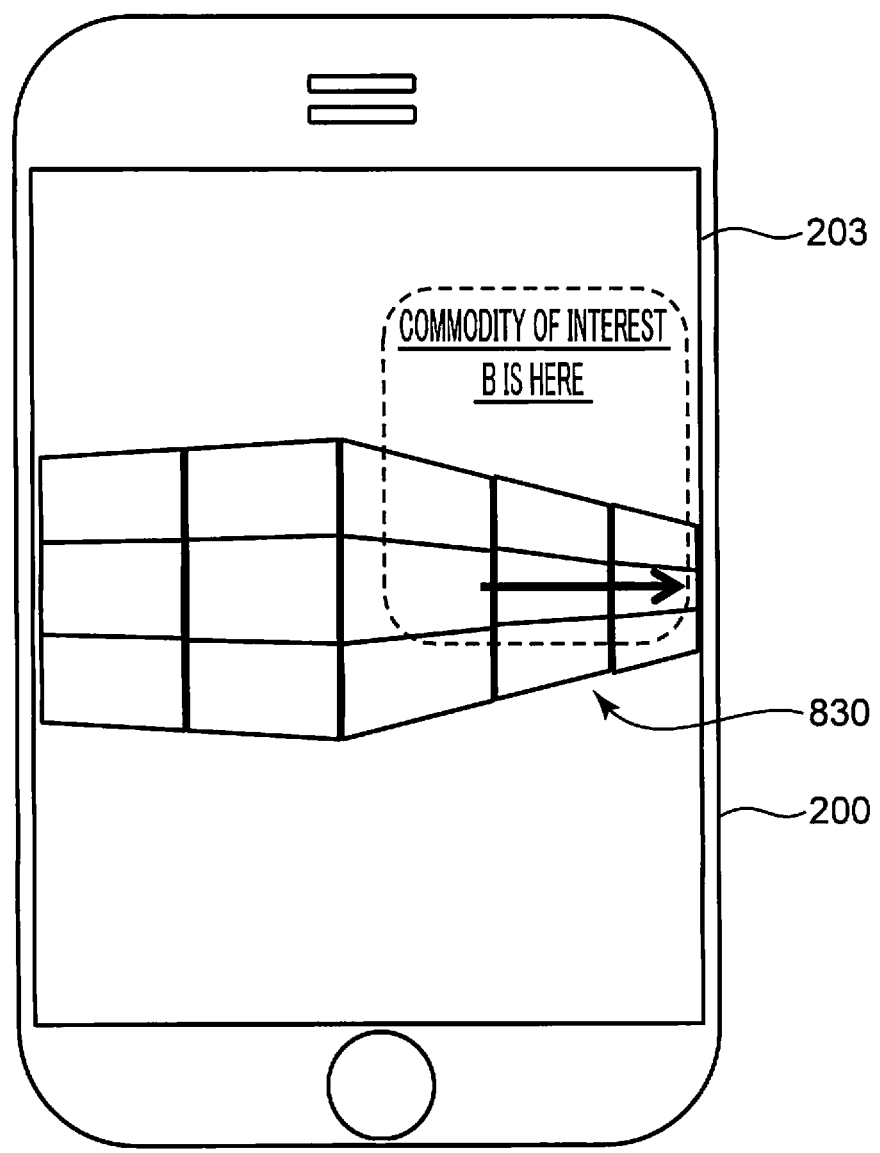
FIG. 13 is a diagram showing another example of the guidance information displayed when the commodity of interest is absent in the photographed image.
Figure 14:
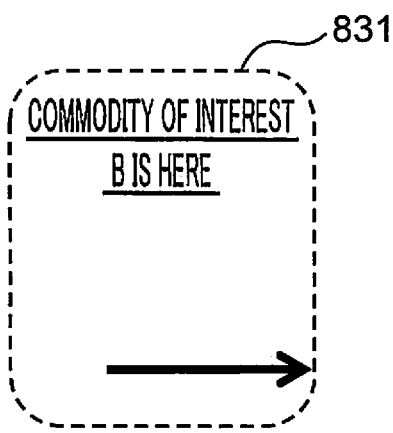
FIG. 14 is a diagram showing an example of a user interface component image used in creating the guidance information shown in FIG. 13.

FIG. 13 is a diagram showing another example of the guidance information displayed when the commodity of interest is absent in the photographed image. FIG. 14 is a diagram showing an example of a user interface component image used when the guidance information shown in FIG. 13 is created.

The guidance information creating unit 104 creates guidance information 830 in which a user interface component image 831 indicating the position of the commodity of interest is superimposed on the photographed image. The guidance information 830 indicates a direction from the position of the specified commodity to the position where the commodity of interest is present. Note that the user interface component image 831 is stored in the memory in the guidance service apparatus 100 in advance.

When the commodity B is present in the commodity-of-interest list and the commodity A is the specified commodity, as shown in FIG. 13, the display unit 203 of the guiding apparatus 200 presents the guidance information 830 indicating that the commodity B is present in the right direction.

As shown in FIG. 13, the display unit 203 of the guiding apparatus 200 may superimpose a relative position of the commodity of interest B on an actually photographed image and present the relative position. Note that the user interface component image 831 is an example of an image superimposed on the actually photographed image.

Note that, in this embodiment, the guidance information creating unit 104 creates the guidance information 830 in which the user interface component image 831 indicating the position of the commodity of interest is superimposed on the photographed image. However, the present invention is not particularly limited to this. The guidance information creating unit 104 may create, as the guidance information, only the user interface component image 831 indicating the position of the commodity of interest. In this case, the guiding apparatus 200 superimposes the guidance information (the user interface component image 831) received from the guidance service apparatus 100 on an image photographed by the photographing unit 201 on a real time basis and displays the guidance information. The guidance information is transmitted together with information for specifying a display position of the guidance information on the display screen of the display unit 203.

When the commodity of interest is present in an invisible position in the photographed image, the guiding apparatus 200 may show an imaginary position of the commodity of interest.

Figure 15:
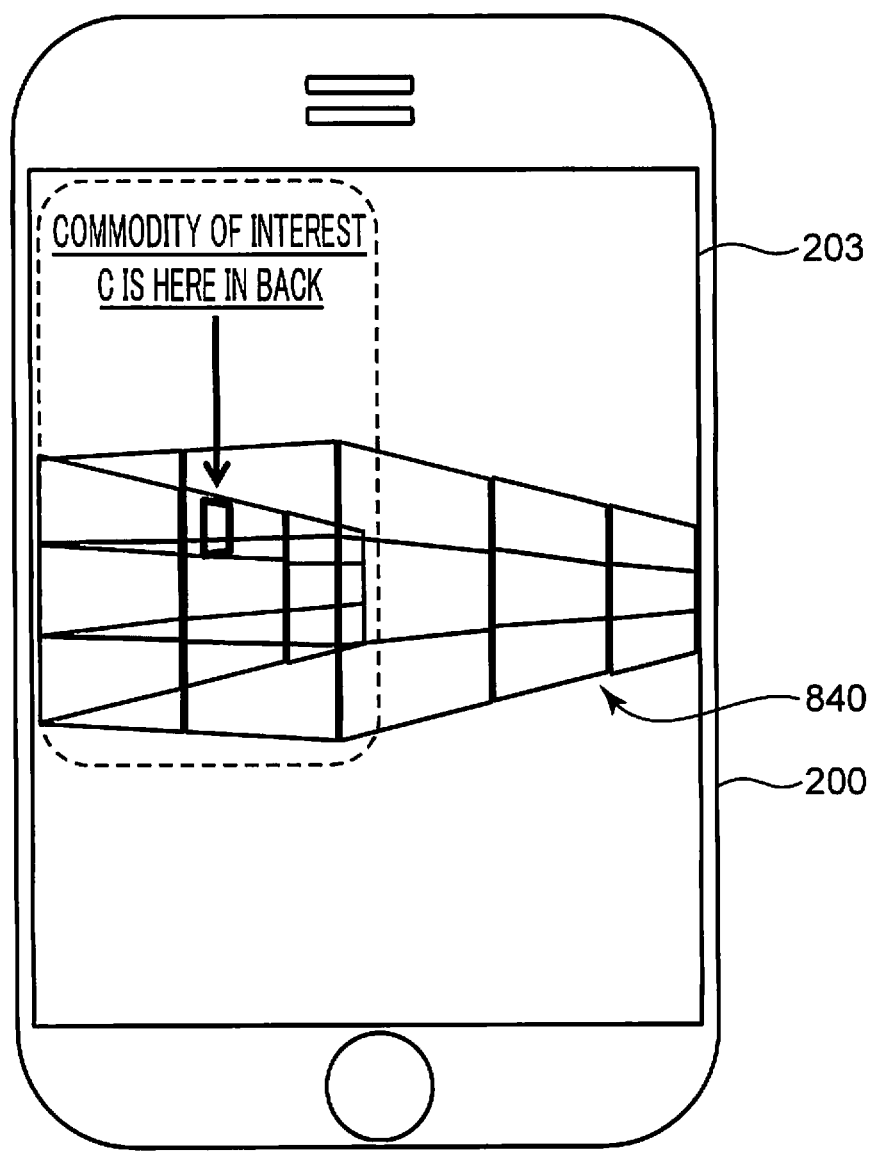
FIG. 15 is a diagram showing an example of guidance information displayed when the commodity of interest is present in an invisible position in the photographed image.
Figure 16:
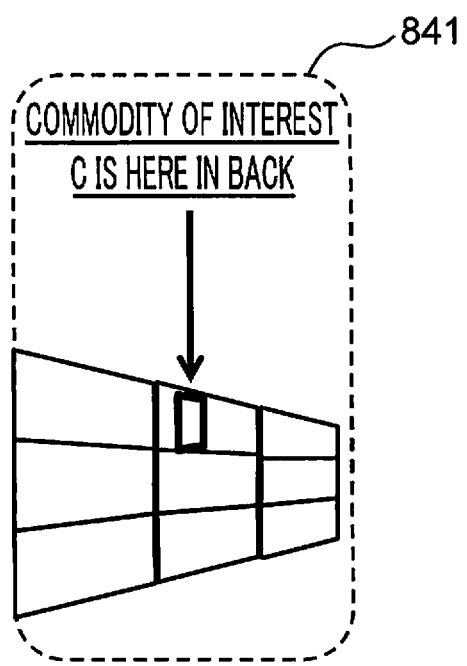
FIG. 16 is a diagram showing an example of a user interface component image used in creating the guidance information shown in FIG. 15.

FIG. 15 is a diagram showing an example of the guidance information displayed when the commodity of interest is present in an invisible position in the photographed image. FIG. 16 is a diagram showing an example of a user interface component image used when the guidance information shown in FIG. 15 is created.

For example, the commodity C is present in the commodity-of-interest list, the commodity C is arranged on a shelf on the rear side of a shelf on which the commodity A specified from the photographed image is arranged, and the commodity C is blocked by the shelf on which the commodity A is displayed and cannot be directly photographed but is present within a field of view of the photographed image.

In this case, as shown in FIG. 15, the display unit 203 of the guiding apparatus 200 may superimpose an imaginary position in a three-dimensional space of the commodity of interest C on an actually photographed image and present the imaginary position. Note that a user interface component image 841 is an example of an image superimposed on the actually photographed image.

The guidance information creating unit 104 creates guidance information 840 in which the user interface component image 841 indicating an imaginary position in a three-dimensional space of the commodity of interest is superimposed on the photographed image. The guidance information 840 indicates the imaginary position where the commodity of interest is present in the three-dimensional space. Note that the user interface component image 841 is stored in the memory in the guidance service apparatus 100 in advance.

When the commodity C is present in the commodity-of-interest list, the commodity A is the specified component, and the commodity C is displayed on a shelf on the rear side of the shelf on which the commodity A is displayed, as shown in FIG. 15, the display unit 203 of the guiding apparatus 200 presents the guidance information 840 indicating that the commodity C is present on the shelf on the rear side of the shelf on which the commodity A is displayed. In this case, an invisible shelf image is actually superimposed on the photographed image together with the position of the commodity C, which is the commodity of interest.

Note that, in this embodiment, the guidance information creating unit 104 creates the guidance information 840 in which the user interface component image 841 indicating the imaginary position of the commodity of interest is superimposed on the photographed image. However, the present invention is not particularly limited to this. The guidance information creating unit 104 may create, as the guidance information, only the user interface component image 841 indicating an imaginary position of the commodity of interest. In this case, the guiding apparatus 200 superimposes the guidance information (the user interface component image 841) received from the guidance service apparatus 100 on an image photographed by the photographing unit 201 on a real time basis and displays the guidance information. The guidance information is transmitted together with information for specifying a display position of the guidance information on the display screen of the display unit 203.

Figure 17:
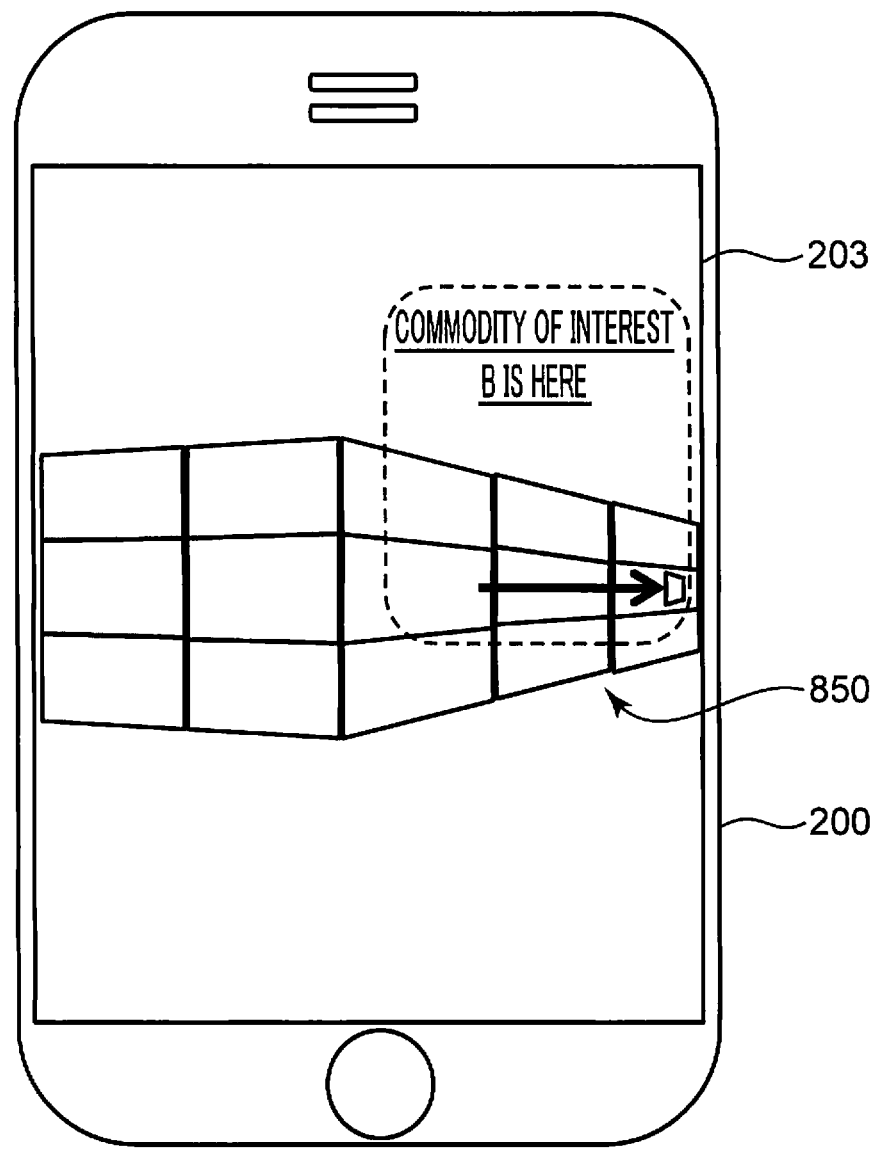
FIG. 17 is a diagram showing an example of guidance information displayed when a specified commodity is not a commodity of interest and the commodity of interest is present in a photographed image.
Figure 18:
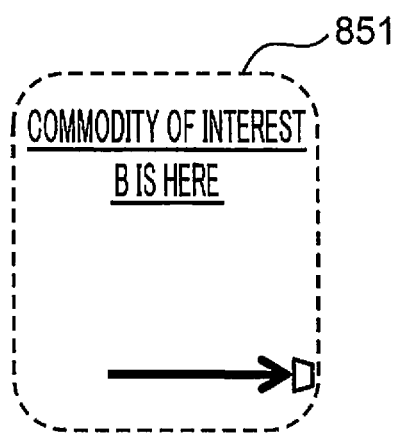
FIG. 18 is a diagram showing an example of a user interface component image used in creating the guidance information shown in FIG. 17.

FIG. 17 is a diagram showing an example of guidance information displayed when a specified commodity is not a commodity of interest and the commodity of interest is present in a photographed image. FIG. 18 is a diagram showing an example of a user interface component image used when the guidance information shown in FIG. 17 is created.

In the example shown in FIG. 17 and FIG. 18, even when the resolution of the photographed image is low and the commodity of interest in the photographed image is not specified as a commodity, the guiding apparatus 200 presents the position of the commodity of interest in the photographed image.

That is, when it is determined that the specified commodity does not coincide with the commodity of interest, the guidance information creating unit 104 acquires an arrangement position corresponding to the specified commodity. Subsequently, the guidance information creating unit 104 acquires an arrangement position corresponding to the commodity of interest. Subsequently, the guidance information creating unit 104 specifies the position of a shelf included in the photographed image and determines whether the acquired arrangement position corresponding to the commodity of interest is included in the photographed image. Note that the position of the shelf included in the photographed image can be specified by identifying a shelf name posted on the shelf through an image analysis.

When the arrangement position corresponding to the commodity of interest is included in the photographed image, the guidance information creating unit 104 creates, as the guidance information, an image indicating a position in the photographed image of the commodity of interest. On the other hand, when the arrangement position corresponding to the commodity of interest is not included in the photographed image, the guidance information creating unit 104 creates, as the guidance information, an image indicating the position of the commodity of interest (an image indicating a direction in which the commodity of interest is present).

When the arrangement position corresponding to the commodity of interest is included in the photographed image, the guidance information creating unit 104 creates guidance information 850 in which a user interface component image 851 indicating the position of the commodity of interest is superimposed on the photographed image. The guidance information 850 indicates the position where the commodity of interest is present. Note that the user interface component image 851 is stored in the memory of the guidance service apparatus 100 in advance.

When the commodity B is present in the commodity-of-interest list and the commodity A is the specified commodity, as shown in FIG. 17, the display unit 203 of the guiding apparatus 200 presents the guidance information 850 indicating that the commodity of interest B is present in the photographed image.

As shown in FIG. 17, the display unit 203 of the guiding apparatus 200 may superimpose a relative position of the commodity of interest B on an actually photographed image and present the relative position. Note that the user interface component image 851 is an example of an image superimposed on the actually photographed image.

Note that, in this embodiment, the guidance information creating unit 104 creates the guidance information 850 in which the user interface component image 851 indicating the position of the commodity of interest is superimposed on the photographed image. However, the present invention is not particularly limited to this. The guidance information creating unit 104 may creates, as the guidance information, only the user interface component image 851 indicating the position of the commodity of interest. In this case, the guiding apparatus 200 superimposes the guidance information (the user interface component image 851) received from the guidance service apparatus 100 on an image photographed by the photographing unit 201 on a real time basis and displays the guidance information. The guidance information is transmitted together with information for specifying a display position of the guidance information on the display screen of the display unit 203.

Figure 19:
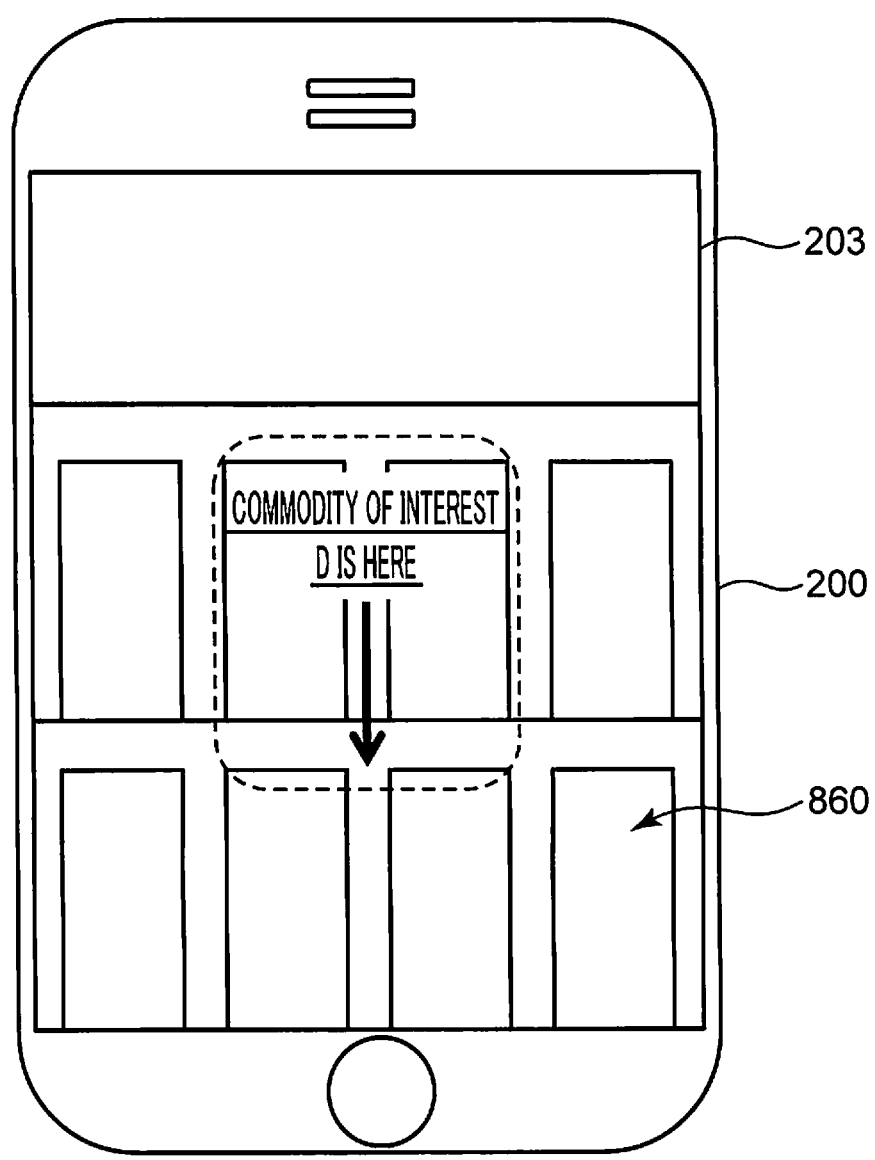
FIG. 19 is a diagram showing an example of guidance information displayed when a commodity of interest is absent in a photographed image in which commodities are two-dimensionally arranged.
Figure 20:
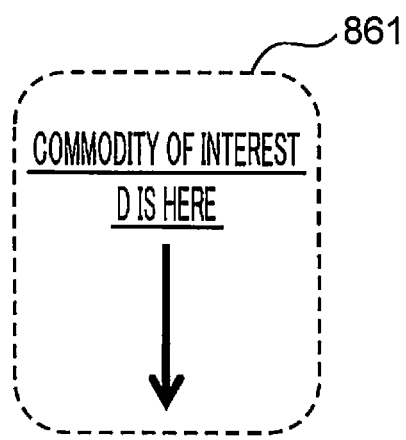
FIG. 20 is a diagram showing an example of a user interface component image used in creating the guidance information shown in FIG. 19.

FIG. 19 is a diagram showing an example of guidance information displayed when a commodity of interest is absent in a photographed image in which commodities are two-dimensionally arranged. FIG. 20 is a diagram showing an example of a user interface component image used when the guidance information shown in FIG. 19 is created.

The guidance information creating unit 104 creates guidance information 860 in which a user interface component image 861 indicating the position of the commodity of interest is superimposed on a photographed image in which commodities are two-dimensionally arranged. The guidance information 860 indicates a direction from the position of a specified commodity to the position where the commodity of interest is present. Note that the user interface component image 861 is stored in the memory in the guidance service apparatus 100 in advance.

When the commodity D is present in the commodity-of-interest list and the commodity B is the specified commodity, as shown in FIG. 19, the display unit 203 of the guiding apparatus 200 presents the guidance information 860 indicating that the commodity D is present in the downward direction.

As shown in FIG. 19, the display unit 203 of the guiding apparatus 200 may superimpose a relative position of the commodity of interest D on an actually photographed image and present the relative position. Note that the user interface component image 861 is an example of an image superimposed on the actually photographed image.

Note that, in this embodiment, the guidance information creating unit 104 creates the guidance information 860 in which the user interface component image 861 indicating the position of the commodity of interest is superimposed on the photographed image. However, the present invention is not particularly limited to this. The guidance information creating unit 104 may create, as the guidance information, only the user interface component image 861 indicating the position of the commodity of interest. In this case, the guiding apparatus 200 superimposes the guidance information (the user interface component image 861) received from the guidance service apparatus 100 on an image photographed by the photographing unit 201 on a real time basis and displays the guidance information. The guidance information is transmitted together with information for specifying a display position of the guidance information on the display screen of the display unit 203.

Note that, in this embodiment, the commodity of interest registered in the commodity-of-interest database 102 is not limited to one commodity of interest. A plurality of commodities of interest are sometimes registered. Therefore, when arrangement positions of the plurality of commodities of interest are acquired, the guidance information creating unit 104 may create guidance information for guiding the user to a commodity of interest present in a position closest from a specified commodity. When the arrangement positions of the plurality of commodities of interest are acquired, the guidance information creating unit 104 may create guidance information for guiding the user to a commodity of interest recently registered. Further, when the arrangement positions of the plurality of commodities of interest are acquired, the guidance information creating unit 104 may create guidance information for guiding the user to the commodities of interest in order from a commodity of interest present in a position closest from the specified commodity. Furthermore, when the arrangement positions of the plurality of commodities of interest are acquired, the guidance information creating unit 104 may create guidance information for guiding the user to the commodities of interest in order from a commodity of interest recently registered.

In this embodiment, the guidance information is displayed by the display unit 203 included in the guiding apparatus 200. However, the present invention is not particularly limited to this. The guidance information may be output by sound by a sound output unit included in the guiding apparatus 200. The guiding apparatus 200 may include a vibrating device that vibrates the guiding apparatus 200. The vibrating device may vibrate the guiding apparatus 200 such that the user moves in the direction of the commodity of interest represented by the guidance information.

In this embodiment, when a plurality of kinds of commodity identification information in a photographed image are specified by the commodity specifying unit 103, the guidance information creating unit 104 may specify arrangement positions in the building of the commodities of interest on the basis of one kind of commodity identification information among the specified plurality of kinds of commodity identification information, the commodity arrangement information retained in the commodity layout database 101, and the commodity-of-interest identification information registered by the user in advance. For example, commodity identification information corresponding to a commodity closest to the center of the photographed image is selected as one kind of commodity identification information among the specified plurality of kinds of commodity identification information.

Note that inventions including configurations explained below are mainly included in the specific embodiment explained above.

A guiding method according to an aspect of the present invention includes: a commodity arrangement information retaining step of retaining, in a commodity arrangement information retaining unit, commodity arrangement information in which a plurality of kinds of commodity identification information for identifying a plurality of commodities arranged indoors and indoor arrangement positions of the plurality of commodities are associated with each other; a photographing step of photographing the periphery of an indoor user; a specifying step of analyzing a photographed image photographed in the photographing step and specifying commodity identification information included in the photographed image; and a guiding step of specifying an indoor arrangement position of a registered commodity registered in advance by the user on the basis of the commodity identification information specified in the specifying step, the commodity arrangement information retained in the commodity arrangement information retaining unit, and registered commodity identification information for identifying the registered commodity, and presenting guidance information for guiding the user to the specified arrangement position of the registered commodity.

With this configuration, the commodity arrangement information is retained in which the plurality of kinds of commodity identification information for identifying the plurality of commodities arranged indoors and the indoor arrangement positions of the plurality of commodities are associated with each other. The commodity identification information included in the photographed image is specified. The indoor arrangement position of the registered commodity is specified on the basis of the specified commodity identification information, the commodity arrangement information, and the registered commodity identification information for identifying a registered commodity registered in advance by the user. The guidance information for guiding the user to the specified arrangement position of the registered commodity is presented.

Therefore, it is possible to guide the user to an indoor position of a commodity in which the user is interested using arrangement positions of commodities included in the photographed image and an indoor arrangement position of the registered commodity registered by the user in advance.

In the guiding method, it is preferable that, in the guiding step, when the commodity identification information specified in the specifying step and the registered commodity identification information coincide with each other, an image indicating a position in the photographed image of the registered commodity is presented as the guidance information.

With this configuration, when the commodity identification information included in the photographed image and the registered commodity identification information coincide with each other, the image indicating the position in the photographed image of the registered commodity is presented as the guidance information. Therefore, when the registered commodity is included in the photographed image, it is possible to present the position in the photographed image of the registered commodity to the user.

In the guiding method, it is referable that, in the guiding step, when the commodity identification information specified in the specifying step and the registered commodity identification information do not coincide with each other, an image indicating the position of the registered commodity is presented as the guidance information.

With this configuration, when the specified commodity identification information and the registered commodity identification information do not coincide with each other, the image indicating the position of the registered commodity is presented as the guidance information. Therefore, even when the registered commodity is not included in the photographed image, it is possible to present the position of the registered commodity to the user.

In the guiding method, it is preferable that, in the guiding step, when the commodity identification information specified in the specifying step and the registered commodity identification information do not coincide with each other, an image indicating a direction in which the registered commodity is present is presented as the guidance information.

With this configuration, when the specified commodity identification information and the registered commodity identification information do not coincide with each other, the image indicating the direction in which the registered commodity is present is presented to the user as the guidance information. Therefore, even when the registered commodity is not included in the photographed image, it is possible to present the direction in which the registered commodity is present to the user.

In the guiding method, it is preferable that, in the guiding step, when the commodity identification information specified in the specifying step and the registered commodity identification information do not coincide with each other and the registered commodity is present in a hidden position in the photographed image, an image indicating an imaginary position of the registered commodity is presented as the guidance information.

With this configuration, when the specified commodity identification information and the registered commodity identification information do not coincide with each other and the registered commodity is present in the hidden position in the photographed image, the image indicating the imaginary position of the registered commodity is presented as the guidance information. Therefore, even when the registered commodity is present in the hidden position in the photographed image, it is possible to present the imaginary position of the registered commodity to the user.

It is preferable that the guiding method further includes an updating step of specifying an indoor arrangement position of the commodity identification information specified in the specifying step and, when the specified arrangement position is different from an arrangement position of the commodity identification information included in the commodity arrangement information, updating the commodity arrangement information to change the arrangement position of the commodity identification information included in the commodity arrangement information to the specified arrangement information.

With this configuration, the commodity arrangement information is updated on the basis of the photographed image. Therefore, it is possible to update the commodity arrangement information to a latest state every time a photographed image is acquired. It is possible to present the position of the registered commodity to the user using the latest commodity arrangement information.

In the guiding method, it is preferable that the registered commodity includes a plurality of registered commodities, and, in the guiding step, guidance information for guiding the user to an arrangement position of a registered commodity closest to the arrangement position of the commodity identification information specified in the specifying step among the plurality of registered commodities is presented.

With this configuration, the guidance information for guiding the user to the arrangement position of the registered commodity closest to the specified arrangement position of the commodity identification information among the plurality of registered commodities is presented. Therefore, even if a plurality of commodities are registered, it is possible to guide the user to a registered commodity present in a position closest from the present position of the user.

A guiding system according to another aspect of the present invention is a guiding system including: a server apparatus; and a guiding apparatus communicably connected to the server apparatus. The server apparatus includes: a commodity arrangement information retaining unit that retains commodity arrangement information in which a plurality of kinds of commodity identification information for identifying a plurality of commodities arranged indoors and indoor arrangement positions of the plurality of commodities are associated with each other; a photographed image acquiring unit that acquires a photographed image obtained by photographing the periphery of an indoor user; a specifying unit that analyzes the photographed image acquired by the photographed image acquiring unit and specifies commodity identification information included in the photographed image; and a guidance information creating unit that specifies an indoor arrangement position of a registered commodity registered in advance by the user on the basis of the commodity identification information specified by the specifying unit, the commodity arrangement information retained by the commodity arrangement information retaining unit, and registered commodity identification information for identifying the registered commodity, and creates guidance information for guiding the user to the specified arrangement position of the registered commodity. The guiding apparatus includes: a photographing unit that photographs the periphery of the indoor user; and a guidance information presenting unit that presents the guidance information created by the guidance information creating unit.

With this configuration, in the server apparatus, the commodity arrangement information is retained in which the plurality of kinds of commodity identification information for identifying the plurality of commodities arranged indoors and the indoor arrangement positions of the plurality of commodities are associated with each other. The photographed image obtained by photographing the periphery of the indoor user is acquired. The acquired photographed image is analyzed and the commodity identification information included in the photographed image is specified. The indoor arrangement position of the registered commodity is specified on the basis of the specified commodity identification information, the retained commodity arrangement information, and the registered commodity identification information for identifying the registered commodity registered in advance by the user. The guidance information for guiding the user to the specified arrangement position of the registered commodity is created. In the guiding apparatus, the periphery of the indoor user is photographed. The created guidance information is presented.

Therefore, it is possible to guide the user to an indoor position of a commodity in which the user is interested using arrangement positions of commodities included in the photographed image and an indoor arrangement position of the registered commodity registered by the user in advance.

Note that the specific embodiment or example explained in the description of embodiments are solely for clarifying the technical contents of the present invention. The specific embodiment or example should not be interpreted in a narrow sense to be limited to only such specific examples and can be variously changed and carried out within the spirit of the present invention and the scope of the claimed matters.

INDUSTRIAL APPLICABILITY

The guiding method and the guiding system according to the present invention can guide a user to the indoor position of a commodity of interest and is useful for a guiding method and a guiding system that guide the user to the position of the commodity of interest.

The invention claimed is:

1. A guiding method comprising:
    storing, in a memory of a server apparatus, commodity arrangement information in which: (i) a plurality of commodity identification information that identifies a respective plurality of commodities, and (ii) respective arrangement positions of the plurality of commodities, are associated with each other;
    registering, with the server apparatus, a commodity of interest, the commodity of interest having commodity identification information and associated position information in the commodity arrangement information stored in the memory of the server apparatus;
    taking a photograph with a user device from a perspective of the user to generate at least one image;
    obtaining, with the server apparatus, commodity identification information that is included in the image, wherein the obtained commodity identification information is associated with a commodity that is visible in the image;
    finding, in the commodity arrangement information in the memory of the server apparatus, the associated position information of the commodity that is visible in the image using the obtained commodity identification information that is included in the image;
    obtaining, from the memory of the server apparatus, the associated position information of the commodity of interest;
    when the commodity identification information that is included in the image and the commodity identification information of the commodity of interest do not coincide with each other and the commodity of interest is present in a hidden position of the image, creating, with the server apparatus, guidance information for guiding the user to the hidden position of the commodity of interest, the guidance information being obtained by superimposing an interface image indicating the hidden position of the commodity of interest on the image in such a manner as to display the hidden position of the commodity of interest on the image associated with the commodity that is visible in the image; and
    sending, with the server apparatus, the created guidance information to the user device.

2. The guiding method according to claim 1, wherein, when the commodity identification information included in the image and the commodity identification information of the commodity of interest coincide with each other, an image indicating a position in the image of the commodity of interest is displayed as the guidance information.

3. The guiding method according to claim 1, wherein, when the commodity identification information included in the image and the commodity identification information of the commodity of interest do not coincide with each other, an image indicating a position of the commodity of interest is displayed as the guidance information.

4. The guiding method according to claim 3, wherein, when the commodity identification information included in the image and the commodity identification information of the commodity of interest do not coincide with each other, an image indicating a direction of the position of the commodity of interest is displayed as the guidance information.

5. The guiding method according to claim 1, further comprising specifying, with the server apparatus, an arrangement position of the commodity identification information included in the image, and, when the specified arrangement position of the commodity identification information included in the image is different from an arrangement position of corresponding commodity identification information included in the commodity arrangement information in the memory of the server apparatus, updating the commodity arrangement information to change the arrangement position associated with the commodity identification information in the commodity arrangement information to the specified arrangement position.

6. The guiding method according to claim 1, comprising:
registering a plurality of commodities of interest, the commodities of interest having commodity identification information and associated position information in the commodity arrangement information stored in the memory of the server apparatus; and
displaying guidance information for guiding the user to an arrangement position of a commodity closest to the commodity that is included in the image.

7. A guiding system comprising:
a server apparatus including a memory; and
a user device communicably connected to the server apparatus, the user device including a camera and a display, wherein the user device takes a photograph from a perspective of the user to generate at least one image;
wherein the server apparatus:
stores, in the memory, commodity arrangement information in which: (i) a plurality of commodity identification information that identifies a respective plurality of commodities, and (ii) respective indoor arrangement positions of the plurality of commodities, are associated with each other;
registers a commodity of interest, the commodity of interest having commodity identification information and associated position information in the commodity arrangement information stored in the memory;
obtains commodity identification information that is included in the image, wherein the obtained commodity identification information is associated with a commodity that is visible in the image;
finds, in the commodity arrangement information in the memory, the associated position information of the commodity that is visible in the image using the obtained commodity identification information that is included in the image;
obtains, from the memory, the associated position information of the commodity of interest;
when the commodity identification information that is included in the image and the commodity identification information of the commodity of interest do not coincide with each other and the commodity of interest is present in a hidden position of the image, creates guidance information for guiding the user to the hidden position of the commodity of interest, the guidance information being obtained by superimposing an interface image indicating the hidden position of the commodity of interest on the image in such a manner as to display the hidden position of the commodity of interest on the image associated with the commodity that is visible in the image; and
sends the guidance information to the user device.

* * * * *